(12) United States Patent
Lee et al.

(10) Patent No.: US 11,625,120 B2
(45) Date of Patent: Apr. 11, 2023

(54) TOUCH DISPLAY DEVICE AND METHOD FOR MANUFACTURING THE SAME

(71) Applicant: LG Display Co., Ltd., Seoul (KR)

(72) Inventors: Yangsik Lee, Gangneung-si (KR); HwiDeuk Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/590,698

(22) Filed: Feb. 1, 2022

(65) Prior Publication Data
US 2022/0155934 A1 May 19, 2022

Related U.S. Application Data

(63) Continuation of application No. 17/098,997, filed on Nov. 16, 2020, now Pat. No. 11,269,446.

(30) Foreign Application Priority Data
Dec. 6, 2019 (KR) .................. 10-2019-0161248

(51) Int. Cl.
*G06F 3/041* (2006.01)
*G06F 3/044* (2006.01)
*G06F 1/16* (2006.01)

(52) U.S. Cl.
CPC ........ *G06F 3/04164* (2019.05); *G06F 1/1652* (2013.01); *G06F 3/0412* (2013.01); *G06F 3/0445* (2019.05); *G06F 2203/04102* (2013.01); *G06F 2203/04103* (2013.01)

(58) Field of Classification Search
CPC ...... G06F 1/1652; G06F 3/041; G06F 3/0412; G06F 3/04164; G06F 3/044; G06F 3/0445; G06F 3/0446; G06F 3/0448; G06F 2203/04102; G06F 2203/04103; G06F 2203/04111; G06F 2203/04112; G06F 2203/04106; G09F 9/301
See application file for complete search history.

(56) References Cited

U.S. PATENT DOCUMENTS

| | | | |
|---|---|---|---|
| 10,340,317 B2 | 7/2019 | Oh et al. | |
| 10,782,830 B2 * | 9/2020 | Liu | G06F 3/0443 |
| 10,901,461 B2 * | 1/2021 | Wu | G06F 1/1643 |
| 11,269,446 B2 * | 3/2022 | Lee | G06F 3/0445 |
| 2014/0054151 A1 * | 2/2014 | Wu | G06F 3/041 |
| | | | 977/956 |

(Continued)

*Primary Examiner* — Joe H Cheng
(74) *Attorney, Agent, or Firm* — Morgan, Lewis & Bockius LLP

(57) ABSTRACT

A display device, and a method of manufacturing the same, includes an encapsulation layer on a display area and a routing area, a touch insulation film on the encapsulation layer and including a plurality of grooves in a first area of the routing area, the routing area including the first area overlapping a folding area of a substrate and a second area not overlapping the folding area, a touch cover on the touch insulation film, a plurality of touch electrodes, at least part of which is disposed at a position overlapping an active area between the encapsulation layer and the touch insulation film or between the touch insulation film and the touch cover, and a plurality of touch signal lines in the routing area and respectively in the plurality of grooves or between the plurality of grooves in the first area, extending in the second direction.

10 Claims, 36 Drawing Sheets

(56) References Cited

U.S. PATENT DOCUMENTS

| | | |
|---|---|---|
| 2016/0126498 A1 | 5/2016 | Kim |
| 2017/0179432 A1 | 6/2017 | Visweswaran et al. |
| 2017/0262109 A1 | 9/2017 | Choi et al. |
| 2017/0278901 A1 | 9/2017 | Kim et al. |
| 2018/0083211 A1 | 3/2018 | Lee et al. |
| 2018/0122871 A1 | 5/2018 | Choi |
| 2018/0329554 A1 | 11/2018 | Beak et al. |
| 2018/0350884 A1 | 12/2018 | Won et al. |
| 2019/0102005 A1 | 4/2019 | Matsumoto |
| 2019/0131562 A1 | 5/2019 | Rhe et al. |
| 2019/0326360 A1 | 10/2019 | Gwon et al. |
| 2019/0361286 A1* | 11/2019 | Jang .................. G02F 1/133305 |
| 2020/0081162 A1* | 3/2020 | Park .................... H01L 51/5253 |
| 2020/0142525 A1 | 5/2020 | Han et al. |
| 2020/0152707 A1 | 5/2020 | Won et al. |
| 2020/0401274 A1 | 12/2020 | Moon et al. |
| 2021/0012687 A1* | 1/2021 | Li ....................... H01L 51/5284 |
| 2021/0064188 A1* | 3/2021 | Lee ....................... G06F 3/0443 |
| 2021/0157432 A1 | 5/2021 | Lee et al. |
| 2021/0333967 A1 | 10/2021 | Feng |

\* cited by examiner

TOUCH DISPLAY DEVICE AND METHOD FOR MANUFACTURING THE SAME

CROSS REFERENCE TO RELATED APPLICATION

This application is a continuation of U.S. patent application Ser. No. 17/098,997, filed Nov. 16, 2020, now U.S. Pat. No. 11,269,446 B2, which claims priority from Republic of Korea Patent Application No. 10-2019-0161248, filed on Dec. 6, 2019, both of which are hereby incorporated by reference in its entirety.

BACKGROUND

Technical Field

Embodiments of the present disclosure relate to a touch display device and a method for manufacturing the same.

Discussion of the Related Art

Along with the development of the information society, the demands for display devices for displaying images are growing in a variety of forms. In this context, various types of display devices, such as e.g., liquid crystal display (LCD) devices, plasma display devices, organic light emitting display devices (OLED) and so on have been widely used.

Such display devices are applied not only to mobile devices such as smartphones or tablet PCs, but also to various fields such as televisions, automobile displays and/or wearable devices.

Further, a display device may include a touch panel, so that intuitive and convenient inputting of user's commands can be effected by touching a screen using the touch panel. A display device including such a touch panel may be referred to as a touch display device.

In order to make the mobile devices easy to carry, many researches on a foldable display device capable of being carried in a folded state and displaying an image in an unfolded state in use have been actively carried out to date.

In the meantime, as such a foldable display device usually undergoes repeated folding and unfolding motion in use, damage may be caused to its folded portion that is often subjected to compressive and contractive forces in use, in particular, while folding and/or unfolding the foldable display device, so that it could then lead to a problem of deterioration in its touch sensitivity. Consequently, there is a need to prevent or suppress occurrence of some damage onto the foldable display device while folding and unfolding the same.

SUMMARY

Accordingly, embodiments of the present disclosure are directed to a touch display device and a method for manufacturing the same that substantially obviate one or more of the problems due to limitations and disadvantages of the related art.

An aspect of embodiments of the present disclosure is to provide a foldable touch display device and a method for manufacturing the same.

Another aspect of embodiments of the present disclosure is to provide a foldable touch display device capable of preventing deterioration of touch sensitivity in use, and a method for manufacturing the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display device comprises a substrate including a display area in which a gate line extending in a first direction, a data line extending in a second direction, and a pixel connected to the data line are arranged, and a routing area disposed in a rim of the display area; an encapsulation layer disposed on the display area and the routing area; a touch insulation film disposed on the encapsulation layer and including a plurality of grooves disposed in a first area of the routing area, the routing area including the first area overlapping a folding area of the substrate and a second area not overlapping the folding area; a touch cover disposed on the touch insulation film; a plurality of touch electrodes is disposed at a position overlapping an active area between the encapsulation layer and the touch insulation film or between the touch insulation film and the touch cover; and a plurality of touch signal lines disposed in the routing area, disposed in the plurality of grooves or in between the plurality of grooves in the first area, and extending in the second direction.

In another aspect, a method of manufacturing a display device comprises disposing a plurality of touch signal lines at a position overlapping a routing area on an encapsulation layer disposed on a display area and the routing area of a substrate; disposing a touch insulation film including a plurality of grooves in first area on the encapsulation layer on which the touch signal lines are disposed, wherein the plurality of touch signal lines each are equally arranged in the plurality of grooves; and disposing a touch cover on the touch insulation film.

In still another aspect, a method of manufacturing a display device comprises disposing a touch insulation film including a plurality of grooves on an encapsulation layer, disposing a plurality of touch signal lines between the plurality of grooves and on the touch insulation film, and disposing a touch cover on the touch insulation film in which a plurality of signal lines are arranged.

According to the embodiments of the present disclosure, it is possible to provide a foldable touch display device and a method of manufacturing the same.

According to the embodiments of the present disclosure, it is possible to provide a touch display device and a method of manufacturing the same, capable of preventing deterioration in touch sensitivity.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
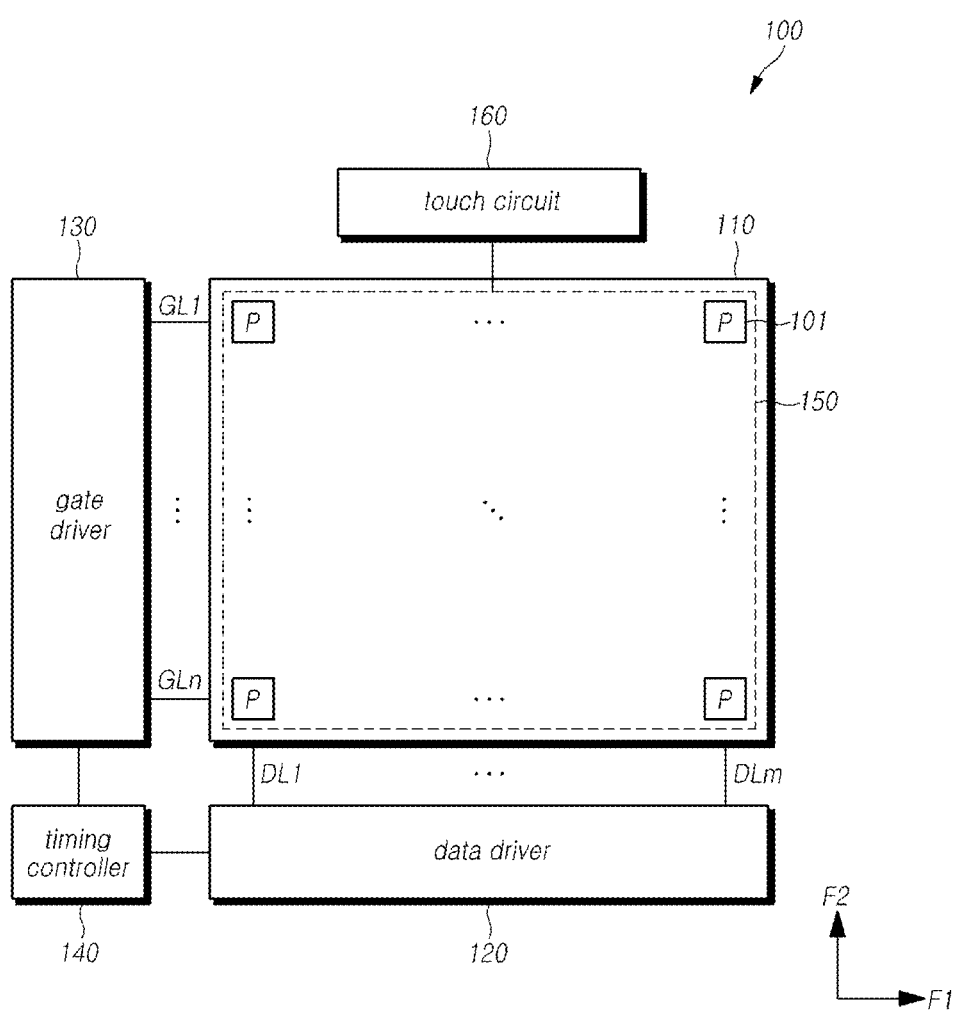
FIG. 1 is a structural diagram illustrating a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a structural diagram illustrating a touch display device according to embodiments of the present disclosure.

Referring now to FIG. 1, the touch display device 100 may include a display panel 110, a data driver 120, a gate driver 130, a timing controller 140, a touch sensor 150, and a touch circuit 160.

The display panel 110 may display images. The display panel 110 may include a plurality of gate lines GL1 to GLn extending in ae first direction F1 and a plurality of data lines DL1 to DLm arranged in a second direction F2. Here, although the first direction F1 and the second direction F2 are illustrated as orthogonal, they are not limited thereto. The display panel 110 may be further configured to include a plurality of pixels 101 connected to the plurality of gate lines GL1 to GLn and the plurality of data lines DL1 to DLm, respectively. The plurality of pixels 101 may include a light emitting diode and a pixel circuit supplying a driving current to the light emitting diode, although not limited thereto.

The pixel circuit may be connected to the gate lines GL1 to GLn and the data lines DL1 to DLm to supply a driving current to the light emitting diode. Here, the wirings arranged on the display panel 110 are not limited to the plurality of gate lines GL1 to GLn and the plurality of data lines DL1 to DLm.

The data driver 120 may be configured to receive an image signal, generate a data signal, and then apply the signal to the plurality of data lines DL1 to DLm. The data signal may be adapted to correspond to gradations, wherein a voltage level of the data signal may be determined according to the gradation. The voltage of the data signal may be referred to as a data voltage.

Here, although the number of data drivers 120 is shown as one, it is not limited thereto and may be two or more according to the size and resolution of the display panel 110. Further, the data driver 120 may be implemented as an integrated circuit.

The gate driver 130 may apply a gate signal to the plurality of gate lines GL1 to GLn. The pixel 101 corresponding to the gate lines GL1 to GLn to which the gate signal is applied may receive the data signal. Here, although the number of gate drivers 130 is shown as one, it is not limited thereto, and instead may be two or more. Further, the signal output from the gate driver 130 is not limited to the gate signal.

Further, the gate driver 130 may be disposed on both sides of the display panel 110 so that one gate driver 130 is connected to odd-numbered gate lines of the plurality of gate lines (GL1 to GLn) and the other gate driver 130 is connected to even-numbered gate lines of the plurality of gate lines GL1 to GLn. Further, the gate driver 140 may include a gate signal generation circuit and a level shifter that applies signals and/or voltages to the gate signal generation circuit. In addition, the gate signal generation circuit may be disposed within the display panel 110.

The timing controller 140 may be configured to control the data driver 120 and the gate driver 130. In addition, the timing controller 140 may transmit an image signal corresponding to the data signal to the data driver 120. The video signal may be of a digital signal. The timing controller 140 may make a correct of the image signal to transmit it to the data driver 120, although the operation of the timing controller 140 is not limited thereto. The timing controller 140 may be implemented of an integrated circuit.

The touch sensor 150 may be disposed at a position matching or corresponding to the display panel 110. The touch sensor 150 may output a touch sensing signal in response to a touch point where a finger, a pen, or the like is touched on the display panel 110. The touching detected by the touch sensor 150 may be of a direct touching onto a certain point of the display panel 110 in the touch display device 100. However, the touching is not limited thereto, and the touching may include causing the touch sensor 150 to generate a certain level of change in capacitance with a touching object being spaced a predetermined distance from the display panel 110.

The touch circuit 160 may be configured to supply a touch driving signal to the touch sensor 150. Further, the touch circuit 160 may be adapted to receive a touch sensing signal transmitted from the touch sensor 150 to calculate the position of the touched point. The touch circuit 160 may be adapted to transmit a touch driving signal to the touch sensor 150. The touch circuit 160 may be adapted to transmit location information on the calculated touch point to a set. The set may be an application processor, although it is not limited thereto.

Figure 2:
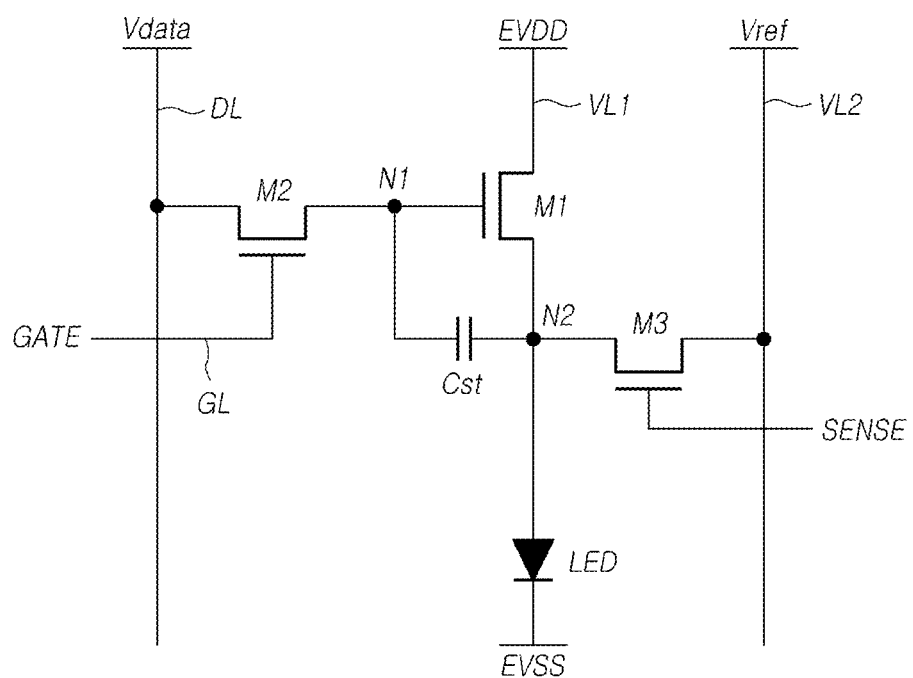
FIG. 2 is a circuit diagram illustrating a pixel according to embodiments of the present disclosure.

FIG. 2 is a circuit diagram illustrating a pixel according to embodiments of the present disclosure.

Referring then to FIG. 2, the pixel 101 may include a light emitting diode (LED) and a pixel circuit 101P to drive the light emitting diode (LED). The pixel circuit 101P may include a first transistor M1, a second transistor M2, a third transistor M3, and a capacitor Cst.

The first transistor M1 may be configured so that a first electrode is connected to a first power line VL to which a first power EVDD is transmitted, a gate electrode is connected to the first node N1, and a second electrode is connected to a second node N2. The first transistor M1 may be adapted to allow a current to flow through the second node N2 in response to a voltage transferred to the first node N1. The first electrode of the first transistor M1 may be a drain electrode, and its second electrode may be a source electrode, although it is not limited thereto.

Then, the current flowing through the second node N2 may be obtained from the following equation 1:

$$Id = k(V_{GS} - Vth)^2 \qquad (1)$$

wherein Id stands for the amount of the current flowing through the second node N2, k stands for the electron mobility of the transistor, VGS stands for a voltage difference between the gate electrode and the source electrode of the first transistor (M1), and Vth stands for a threshold voltage of the first transistor M1.

The second transistor M2 may be configured so that a first electrode is connected to the data line DL, a gate electrode is connected to the gate line GL, and a second electrode is connected to the first node N1. Accordingly, the second transistor M2 may be adapted to transmit a data voltage Vdata corresponding to the data signal to the first node N1 in response to a gate signal GATE transmitted through the gate line GL. Here, the first electrode of the second transistor M2 may be a drain electrode, and the second electrode thereof may be a source electrode, although they are not limited thereto.

The capacitor Cst may be connected between the first node N1 and the second node N2, and the capacitor Cst may be adapted to maintain the voltages of the gate electrode and the source electrode of the first transistor M1 constant.

The light emitting diode (LED) may include an anode electrode, a cathode electrode, and a light emitting layer disposed between the anode electrode and the cathode electrode to emit light in response to a driving current. The light emitting layer may include a plurality of films. The light emitting layer may further include at least one of an organic film and an inorganic film. In the light emitting diode (LED), the anode electrode may be connected to the second node N2 and the cathode electrode may be connected to the second power source EVSS. Here, the second power source EVSS may supply a voltage lower than the voltage level of the first power source EVDD. The second power source EVSS may be of ground. However, it is not limited thereto.

The light amount of the light emitting diode (LED) may be determined in accordance with the amount of driving current flowing from the anode electrode to the cathode electrode. The light emitting diode (LED) may emit any one of red, green, blue, and white colors, although it is not limited thereto.

Figure 3:
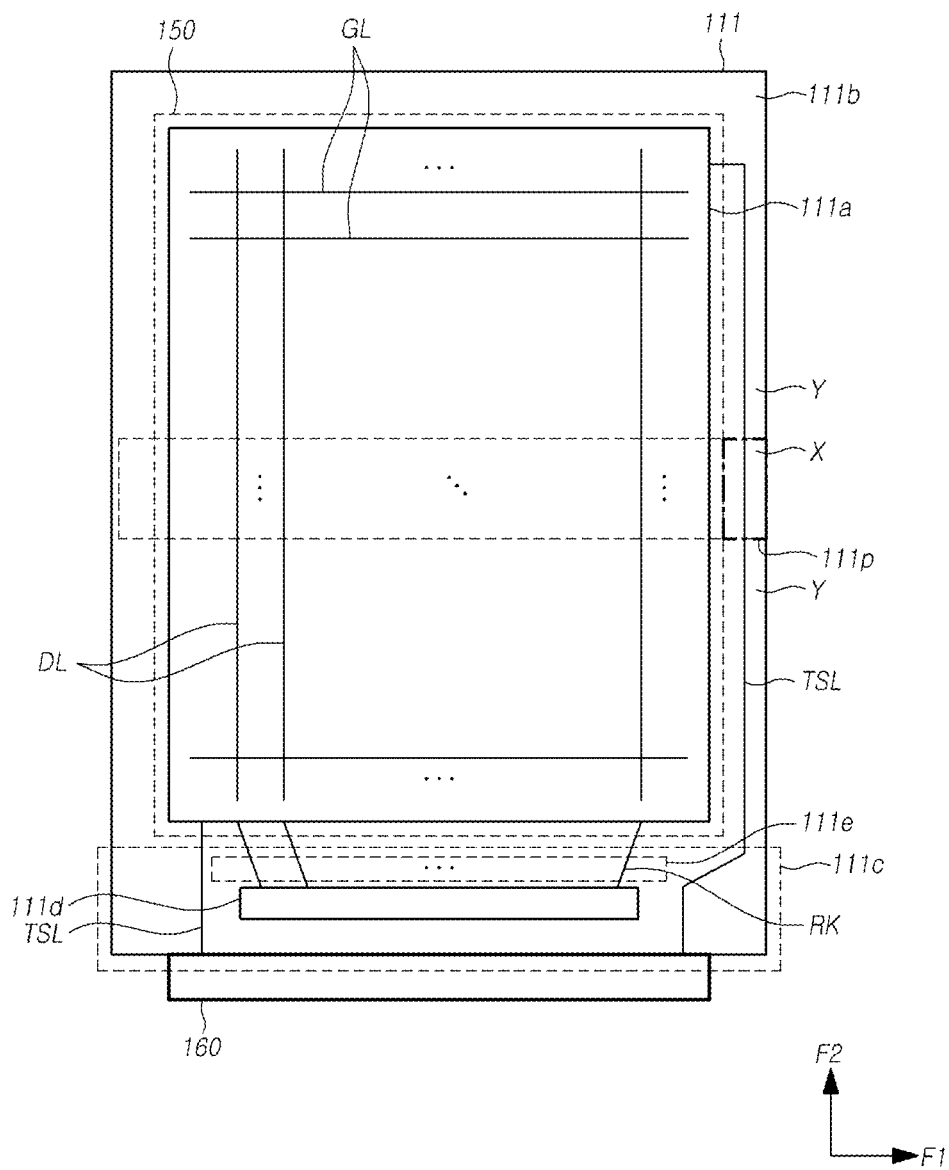
FIG. 3 is a plan view illustrating an embodiment of a display device according to the present disclosure.

FIG. 3 is a plan view illustrating an embodiment of a display device according to the present disclosure.

Referring to FIG. 3, the display device 100 may include a substrate 111 including a display area 111a in which a plurality of gate lines GL extending in a first direction F1, a plurality of data lines DL extending in a second direction F2, and a plurality of pixels each connected to the plurality of gate lines GL and the plurality of data lines DL are disposed, and a routing area 111b disposed in or around a border or rim of the display area 111a.

The substrate 111 may include a folding area 111p that may include part of the display area 111a and part of the routing area 111b. The routing area 111b may include a first area X overlapping the folding area 111p and a second area Y not overlapping the folding area 111p.

Further, a plurality of power lines and signal lines may be arranged in the routing area 111b, and a circuit area 111c in which a driver IC 111d is disposed may be arranged underneath the substrate 111. The driver IC 111d disposed in the circuit area 111c may be the data driver 120 shown in FIG. 1, although it is not limited thereto. And, a plurality of touch signal line TSL may be arrange on the substrate 111. The plurality of touch signal line may be connected to a touch circuit 160.

A link area 111e may be then disposed between the circuit area 111c and the display region 111a, and in the link area 111e may be disposed a plurality of link lines RK each connecting a plurality of output terminals of the driver IC 111d and a plurality of data lines DL arranged in the display area 111a. A gate signal generation circuit may be disposed on the left and right sides of the display area 111a, and some of the link lines RK may be adapted to supply a clock signal to the gate signal generation circuit to generate a gate signal in the gate signal generation circuit, so that the gate signal can be supplied to the plurality of gate line (GL). The substrate 111 may be formed to bend in the link area 111e.

Figure 4:
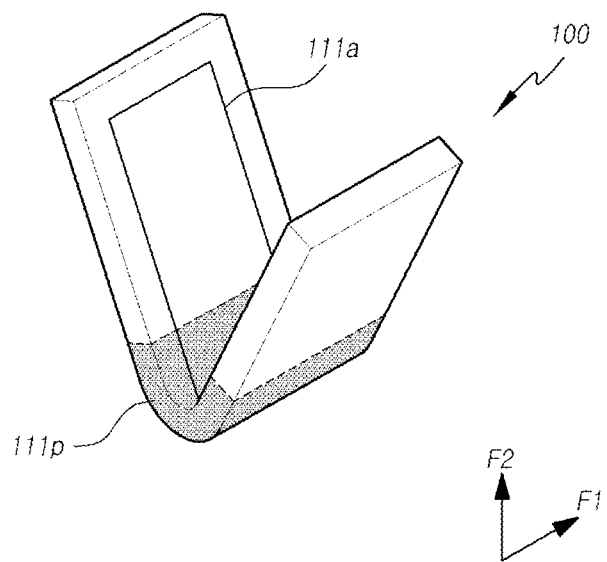
FIG. 4 is a view schematically showing a state in which a display device according to the present disclosure is folded.

FIG. 4 schematically shows the display device according to the present disclosure while it is at least partially in a folded state.

Referring now to FIG. 4, it is envisaged that the user may carry the display device 100 in its folded state, while in use the user can view an image displayed on the display area 111a of the display device 100 in its unfolded state. The display device 100 can be folded about an axis in the folding region 111p, as illustrated. When the folding area 111p is folded, the folding area 111p may have a certain curvature. Here, it is illustrated that when the display device 100 is to be folded, opposing surfaces of the display area 111a are not in contact with each other surface, but they are not limited thereto.

Figure 5:
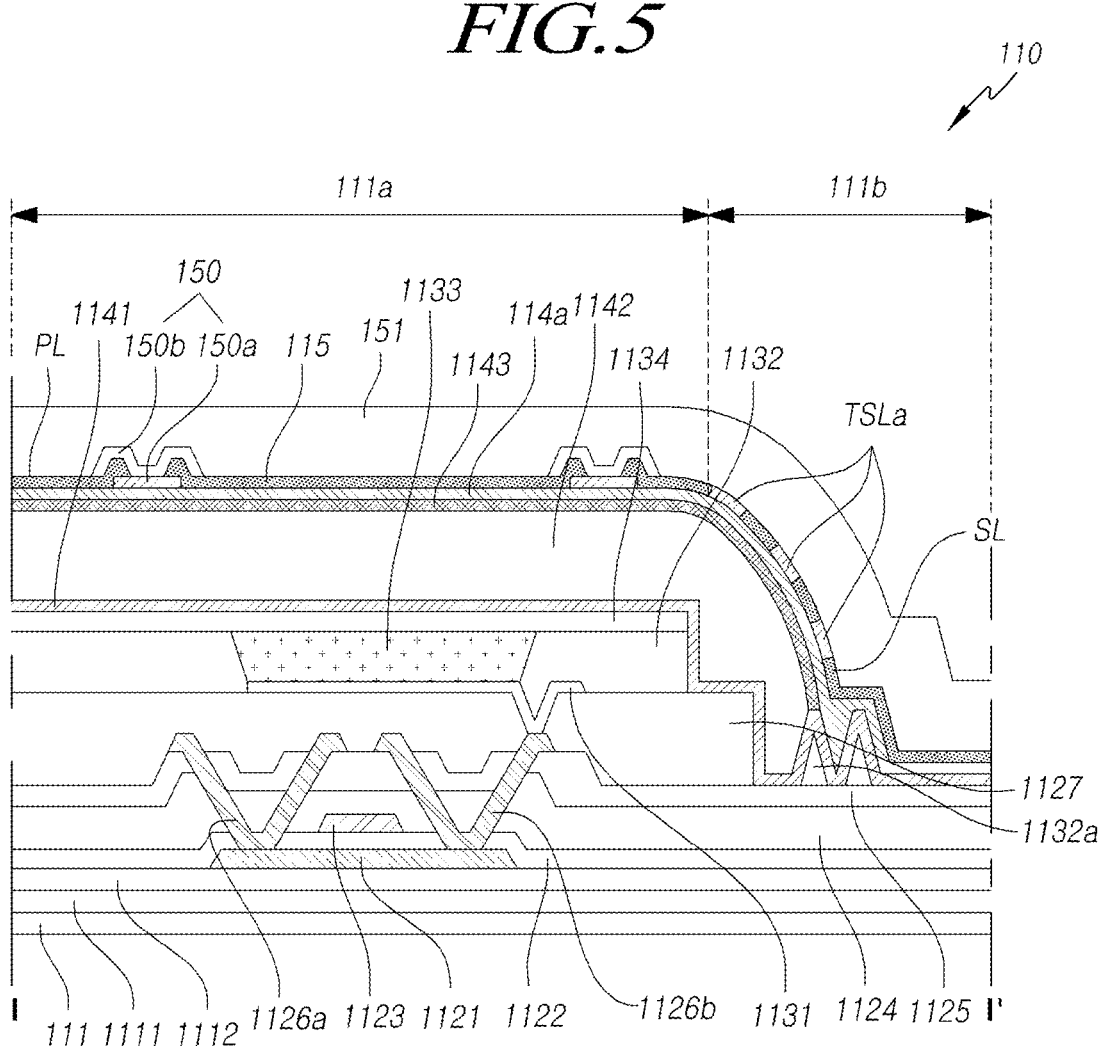
FIGS. 5 and 6 each are cross-sectional views illustrating a cross section of a display device according to embodiments of the present disclosure.
Figure 6:
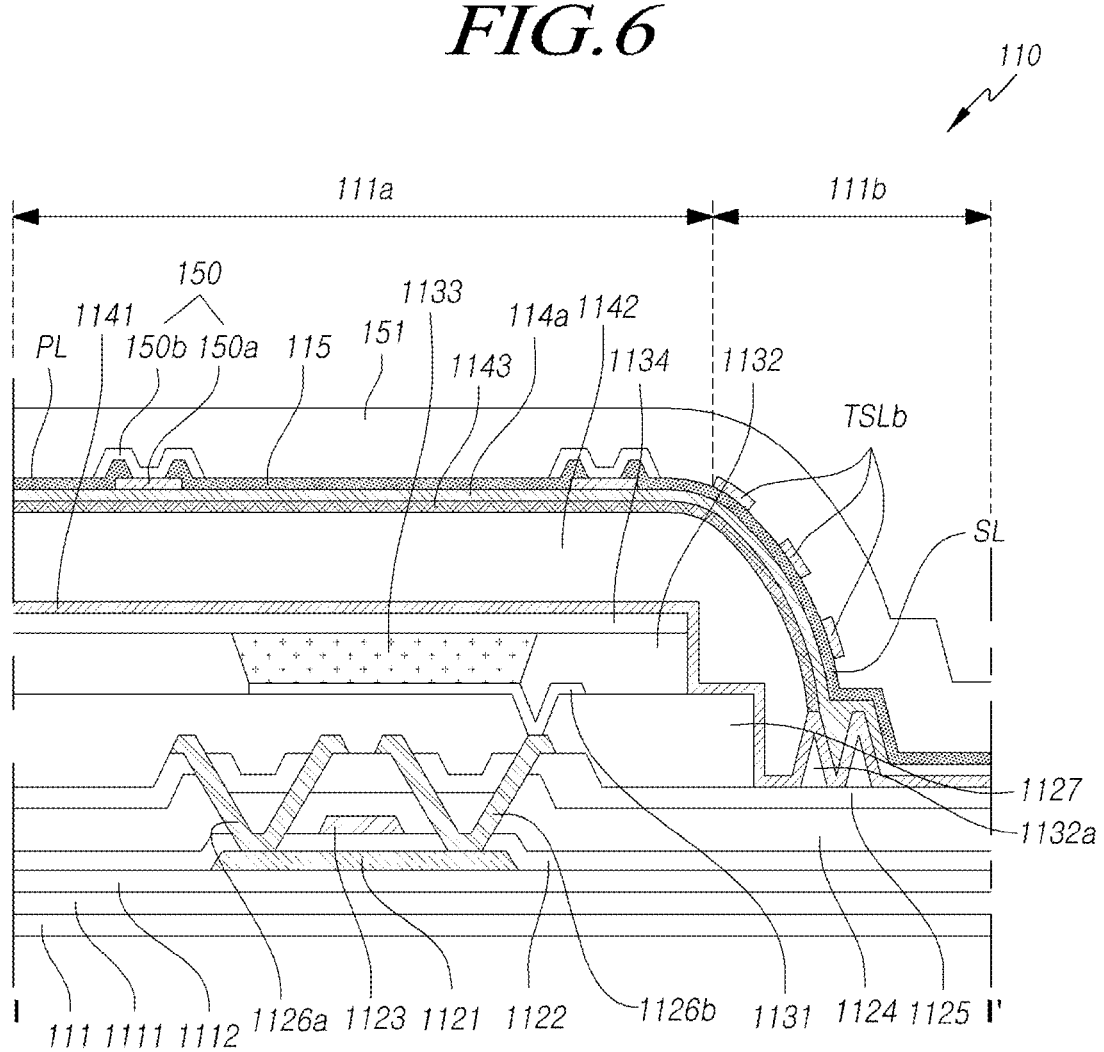

FIGS. 5 and 6 are schematic cross-sectional views of a display panel according to embodiments of the present disclosure.

Referring now to FIGS. 5 and 6, the display panel 110 may have a multi-buffer layer 1111 formed on a substrate 111 and an active buffer layer 1112 formed on the multi-buffer layer 1111. The multi-buffer layer 1111 and the active buffer layer 1112 may be generally referred to as a buffer layer. The substrate 111 may include polyamide (PI), although it is not limited thereto. In addition, the substrate 111 may be flexible, in which the flexible substrate 111 is allowed to be folded or bent as circumstance requires.

An active layer 1121 may be patterned and disposed on the active buffer layer 1112. The multi-buffer layer 1111 and the active buffer layer 1112 may prevent foreign substances present in the display substrate 111 from penetrating into the active layer 112a. The multi-buffer layer 1111 may include a plurality of inorganic films, and each inorganic film may include silicon dioxide ($SiO_2$) and silicon nitride (SiNx). In addition, the active buffer layer 1112 may include an inorganic film, and the inorganic film may include silicon dioxide ($SiO_2$).

A gate insulation film 1122 may be disposed on the active layer 1121. Further, a gate electrode 1123 formed by patterning a gate metal may be disposed on the gate insulation film 1122. The gate insulation film 1122 may include silicon dioxide ($SiO_2$). A first interlayer insulating film 1124 and a second interlayer insulating film 1125 may be disposed sequentially stacked on the gate electrode 1123. The first interlayer insulating film 1124 may include silicon dioxide ($SiO_2$) and silicon nitride (SiNx), and the second interlayer insulating film 1125 may also include silicon dioxide ($SiO_2$) and silicon nitride (SiNx). A source drain metal may be patterned on the second interlayer insulating layer 1125 to form a drain electrode 1126a and a source electrode 1126b. A planarization layer 1127 may be disposed on the drain electrode 1126a and the source electrode 1126b.

Further, an anode electrode 1131 may be disposed on the planarization layer 1127. Then, a contact hole may be formed in the planarization layer 1127 and the anode electrode 1131 may be connected to a source electrode 1126b through the contact hole. Further, a bank 1132 may be formed on the planarization layer 1127, a cavity may be formed in the bank 1132, and a light emitting layer 1133 may be then formed in the cavity. Here, the light emitting film 1133 is illustrated as a single film, but it is not limited thereto and may include a plurality of films. A cathode electrode 1134 may be formed on the light emitting layer 1113, and the cathode electrode 1134 may be a common electrode.

An encapsulation layer 114 may be then disposed on the cathode electrode 1134. The encapsulation layer 114 may further include a first inorganic film 1141, a second inorganic film 1143, an organic film 1142 disposed between the first inorganic film 1141 and the second inorganic film 1143. The thickness of the organic film 1142 may be formed to be thicker than those of the first inorganic film 1141 and the second inorganic film 1143, thereby protecting any foreign matters from passing through the encapsulation layer 114 to penetrate the light emitting film 1133.

A double dam 1132a may be formed on the substrate 111 to prevent the organic film 1142 from being discharged to the outside, and the first inorganic film 1141 may be formed to cover an uppermost surface of the dam 1132a. In addition, the second inorganic film 1143 may be formed to meet the first inorganic film 1141 at the dam 1132a. The dam 1132a may include the same material as the bank 1132. Here, the number of the dams 1132a is shown to be two in the drawing, but it is not limited thereto. Furthermore, the heights of those dams may be different from each other.

Then, the touch sensor 150 may be disposed on the encapsulation layer 114. The touch sensor 150 may include a plurality of touch electrodes 150a and 150b. Further, the display panel 110 may further include a touch buffer layer 114a disposed on the encapsulation layer 114. The plurality of touch electrodes 150a may be formed by patterning a conductive layer. When the conductive layer is patterned on the encapsulation layer 114, some damage may be applied to the encapsulation layer 114. To prevent this, the touch sensor 150 including the touch electrodes 150a and 150b may be disposed on the touch buffer layer 114a after the touch buffer layer 114a is disposed on the encapsulation layer 114. The plurality of touch electrodes 150a and 150b may include a first touch electrode 150a and a second touch electrode 150b. Further, a touch insulation film 115 may be disposed between the first touch electrode 150a and the second touch electrode 150b.

The touch sensor 150 may be incorporated into the display device 100, by patterning and forming the first touch electrode 150a on the touch buffer layer 114a, and then disposing the touch insulation film 115 on the first touch electrode 150a and disposing the second touch electrode 150b on the touch insulation film 115. A contact hole may be formed in the touch insulation film 115, and the second touch electrode 150b and the first touch electrode 150a may be connected to each other through the contact hole.

Further, a first touch signal line TSLa and/or a second touch signal line TSLb may be disposed on the touch buffer layer 114a. The first touch signal line TSLa may be disposed on the touch buffer layer 114a as shown in FIG. 5. The touch insulation film 115 may be further disposed on the first touch signal line TSLa. Furthermore, the second touch signal line TSLb may be disposed on the touch insulation film 115, as shown in FIG. 6. A touch cover 151 may be disposed on the second touch signal line TSLb, wherein the touch cover 151 may be of either an organic film or an inorganic film.

The display area 111a as shown in FIG. 3 may correspond to a horizontal plane PL of the encapsulation layers 1141, 1142, and 1143, and the routing area 111b in FIG. 3 may correspond to a slope SL of the encapsulation layers 1141, 1142, and 1143. Further, the first touch signal line TSLa and/or the second touch signal line TSLb may be disposed on the slope SL of the encapsulation layers 1141, 1142, and 1143.

Figure 7A:
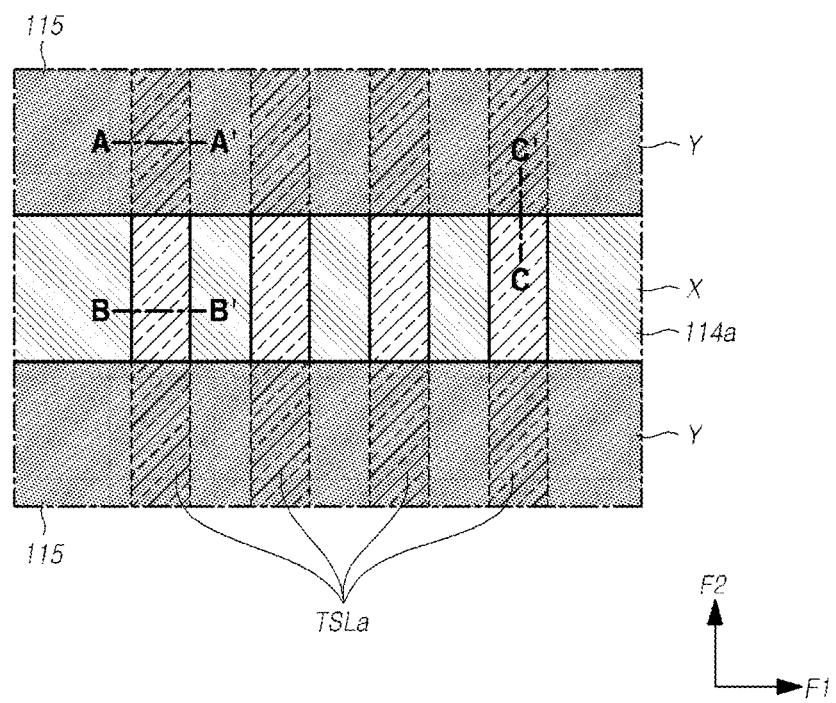
FIG. 7A is a plan view illustrating a part of a routing area in a display device according to embodiments of the present disclosure.
Figure 7B:
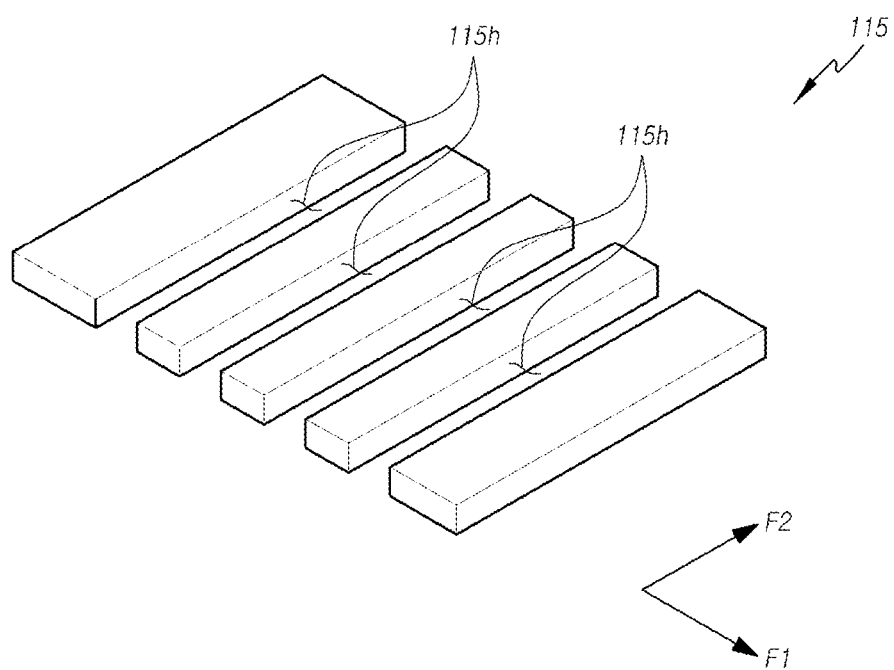
FIG. 7B is a plan view illustrating a touch insulation film disposed in the routing area illustrated in FIG. 7A.

FIG. 7A shows a plan view for a portion of a routing area in a display device according to embodiments of the present disclosure, and FIG. 7B shows a plan view for a touch insulation film disposed in the routing area illustrated in FIG. 7A.

Referring now to FIGS. 7A and 7B, in the routing area of the substrate 111 may be disposed a first area X overlapping the folding area 111p and a second area Y not overlapping the folding region 111p. The second area Y may be disposed to the upper side and the lower side right next to the first area X in the second direction F2, respectively. A touch insulation film 115 may be disposed in the first area X and the second area Y respectively, and the touch insulation film 115 disposed in the first area X may include a plurality of holes 115h.

In addition, a plurality of first touch signal lines TSLa each extending in the second direction F2 may be disposed in the first area X and the second area Y.

In the first area X, the plurality of holes 115h may be disposed to overlap the first touch signal line TSLa, respectively. When the first touch signal line TSLa is disposed to overlap the hole 115h, the touch insulation film 115 is not disposed on the first touch signal line TSLa in the first area X.

In the second area Y, the touch insulation film 115 may be disposed on the first touch signal line TSLa. Here, the touch insulation film 115 may be not disposed on the first touch signal line TSLa disposed in the first area X, while the first touch signal line TSLa disposed in the second area Y may be covered by the insulating layer 115. To represent that the first touch signal lines TSLa disposed in the second area Y are covered with the touch insulation film 115, border lines of the plurality of first touch signal lines TSLa in the second area Y are indicated by a dotted line.

Further, each first touch signal line TSLa may be disposed at a position overlapping a region between the plurality of holes 115h in the first area X. When the first touch signal line TSLa is disposed at the position overlapping the region between the plurality of holes 115h, the touch insulation film may be disposed at the position overlapping the first touch signal line TSLa on the first touch signal line TSLa.

Therefore, since the touch insulation film 115 is not disposed in both the uppermost and lowermost sections of the first touch signal line TSLa disposed in the first area X, no force is substantially applied onto the first area X by the touch insulation film 115 even when folding the folding area. Furthermore, since the first touch signal line TSLa is more ductile than the touch insulation film 115, it is possible to suppress or alleviate damage in the first touch signal line TSLa even if it is bent. Therefore, it is possible to prevent deterioration in touch sensitivity due to possible physical damage in the portion where the substrate 111 is caused to be folded about the folding area.

Figure 8:
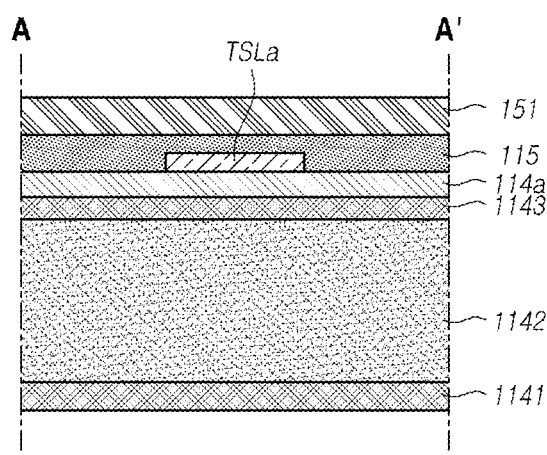
FIG. 8 is a cross-sectional view showing a cross section along a line A-A' in FIG. 7A.
Figure 9:
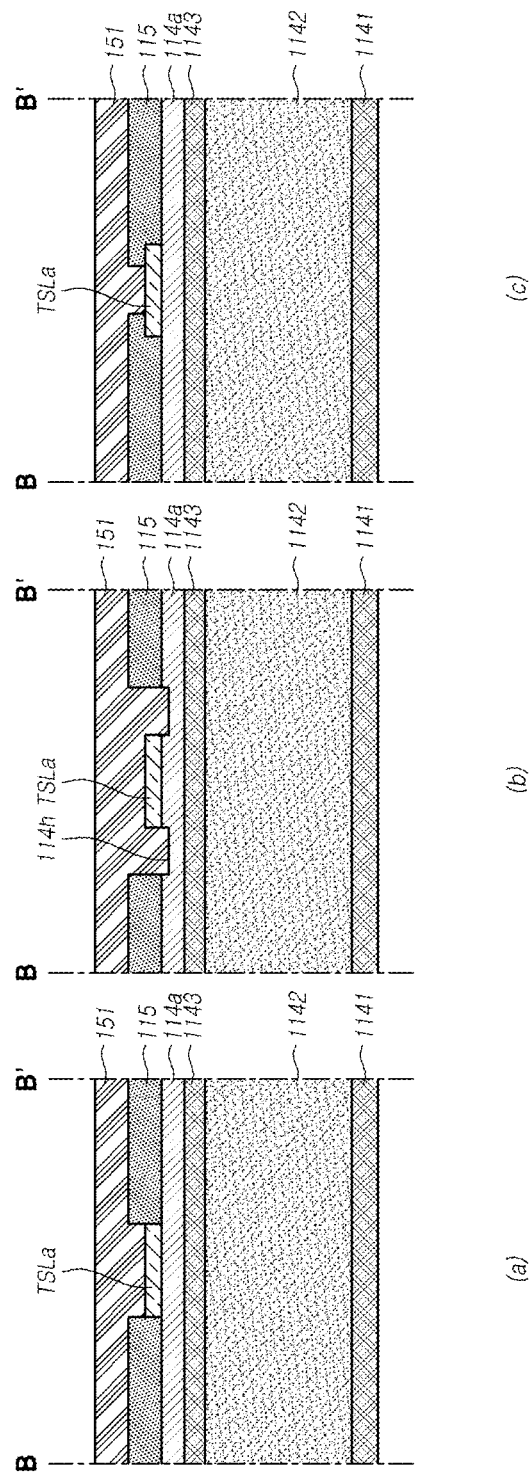
FIG. 9 is a cross-sectional view showing a cross section along a line B-B' in FIG. 7A.
Figure 10:
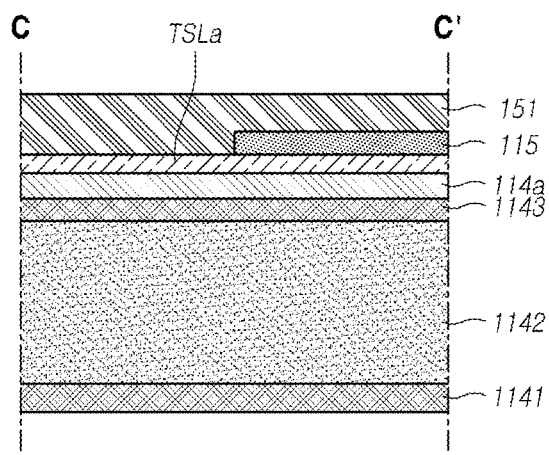
FIG. 10 is a cross-sectional view showing a cross section along a line C-C' in FIG. 7A.

FIG. 8 is a cross-sectional view showing a cross section along a line A-A' in FIG. 7A, and FIG. 9 is a cross-sectional view showing a cross section along a line B-B' in FIG. 7A. Further, FIG. 10 is a cross-sectional view showing a cross section along a line C-C' in FIG. 7A. Here, the first touch signal line TsLa and/or the second touch signal line TSLb represent(s) an arrangement that they are disposed to overlap each other in the plurality of holes 115h.

Referring now to FIGS. 8, 9 and 10, it is shown that the touch buffer layer 114a may be disposed on the encapsulation layer 1141, 1142, 1143 including the first inorganic film 1141, the organic film 1142, and the second inorganic film 1143. Further, the first touch signal line TLSa may be disposed on the touch buffer layer 114a, and the touch insulation film 115 may be disposed on the first touch signal line TLSa. The touch insulation film 115 may be of either an inorganic film or an organic film. The touch cover 151 may be disposed on the touch insulation film 115, and the touch cover 151 may be of either an inorganic film or an organic film.

In the second area Y, the touch insulation film 115 may cover the uppermost surface of the first touch signal line TSLa and the uppermost surface of the touch buffer layer 114a. On the other hand, in the first area X, a plurality of holes 115h may be formed in the touch insulation film 115, and the first touch signal line TSLa may be disposed in each of the plurality of holes 115h, in an overlapping manner, respectively, so that the first touch signal line TSLa can be arranged within the hole 115h of the touch insulation film 115. Further, the touch insulation film 115 may not be disposed on the first touch signal line TSLa. Furthermore, the touch cover 151 may be disposed on the touch insulation film 115 in the first area X and the second area Y, wherein part of the touch cover 151 may be disposed in the plurality of holes 115h in the first area X. The touch cover 151 may be of either an inorganic film or an organic film.

The touch cover 151 may be disposed above the uppermost part of the hole 115h in which the first touch signal line TSLa is disposed, as shown in FIG. 9(a). Further, the first touch signal line TSLa may be disposed in the hole 115h included in the touch insulation film 115. Further, a portion of the touch cover 151 may be inserted into the hole 115h, as shown in FIG. 9(b), so as to come into contact with the touch buffer layer 114a through the left and right sides of the first touch signal line TSLa. When the portion of the touch cover 151 comes into contact with the touch buffer layer 114a, a groove 114h may be formed in the touch buffer layer 114a. In addition, as illustrated in FIG. 9(c), the touch insulation film 115 may be disposed to partially overlap a border of the first touch signal line TSLa. Therefore, the center portion of the first touch signal line TSLa may not be covered by the touch insulation film 115.

Further, as illustrated in FIG. 10, the touch insulation film 115 may be disposed in the first area X and the second area Y, and the plurality of holes 115h may be disposed to extend within the first area X up to the border of the first area X and the second area Y, so that the touch insulation film 115 can be disposed only within the second area Y and it may not be disposed in the first area X corresponding to the hole 115h. The insulating layer 115 may not be disposed. Alternatively, the touch insulation film 115 may not be disposed in the first area X, and instead, part of the touch cover 151 may be disposed.

Figure 11:
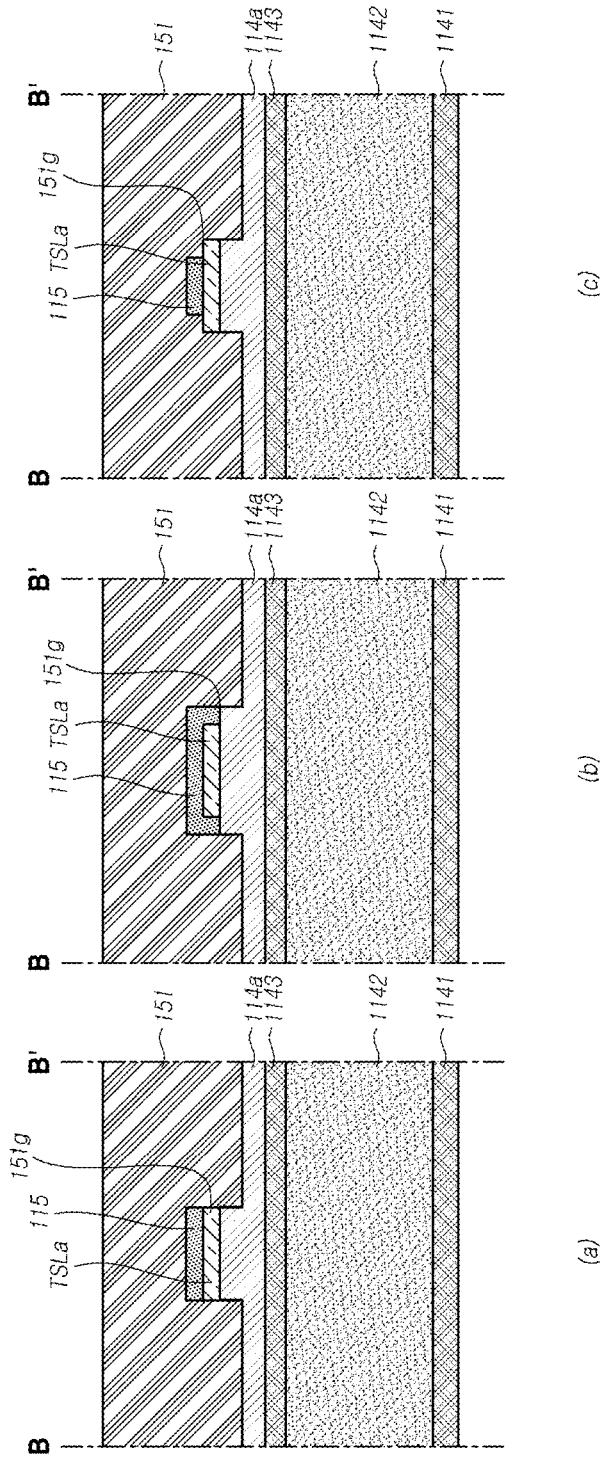
FIG. 11 is a cross-sectional view showing a cross section along a line B-B' in FIG. 7A.
Figure 12:
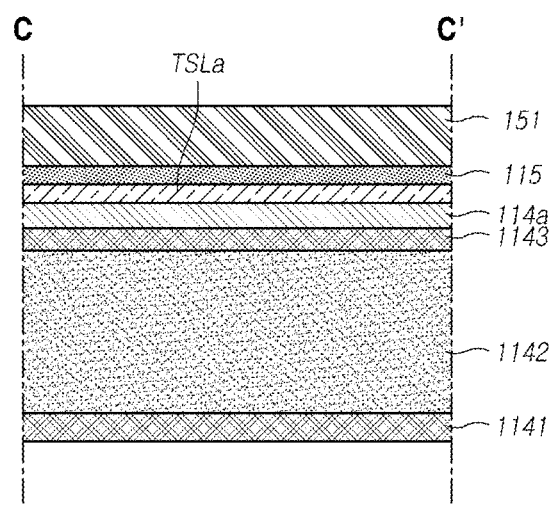
FIG. 12 is a cross-sectional view showing a cross section along a line C-C' in FIG. 7A.

FIG. 11 is a cross-sectional view showing a cross section along a line B-B' in FIG. 7A, and FIG. 12 is a cross-sectional view showing a cross section along a line C-C' in FIG. 7A. Here, the first touch signal line TSLa represents an arrangement where the first touch signal lines TSLa each are disposed to overlap each of the regions between the plurality of holes 115h included in the touch insulation film 115.

Referring now to FIGS. 11 and 12, the touch buffer layer 114a may be disposed on the encapsulation layers 1141, 1142, and 1143 including the first inorganic film 1141, the organic film 1142, and the second inorganic film 1143. Further, the first touch signal line TSLa may be disposed on the touch buffer layer 114a, and the touch insulation film 115 may be disposed on the first touch signal line TSLa. The touch insulation film 115 may be of either an inorganic film or an organic film.

In the second area Y, the touch insulation film 115 may cover the top surface of the first touch signal line TSLa and the top surface of the touch buffer layer 114a. On the other hand, in the first area X, the plurality of holes 115h may be formed in the touch insulation film 115 and a first touch signal line TSLa may be disposed between the plurality of holes 115h, respectively, so that the touch insulation film 115 may be disposed on the first touch signal line TSLa. Further, the touch cover 151 may be disposed on the touch insulation film 115 in the first area X and the second area Y, wherein part of the touch cover 151 may be inserted into the plurality of holes 115h in the first area X.

In addition, the touch cover 151 may be formed with a groove 151g at a position corresponding to the region between the holes 115h of the touch insulation film 115, so that the first touch signal line TSLa and the touch insulation film 115 can be disposed to overlap each other in the groove 151g. At this juncture, part of the touch buffer layer 114a may be inserted into the groove 151g formed in the touch cover 151.

The first touch signal line TSLa and the touch insulation film 115 having the same width, as shown in FIG. 11(a), may be inserted into the groove 151g formed in the touch cover 151. Further, the touch insulation film 115 having a width larger than the widths of the first touch signal line TSLa and the first touch signal line TSLa, as shown in FIG. 11(b), may be inserted into the groove 151g formed in the touch cover 151. Further, the first touch signal line TSLa and the touch insulation film 115 having a width smaller than the widths of the first touch signal line TSLa, as shown in FIG. 11(c), may be inserted into the groove 151g formed in the touch cover 151. Here, the width of the groove 151g formed in the touch cover 151 may be wider than that of the first touch signal line TSLa.

Figure 13:
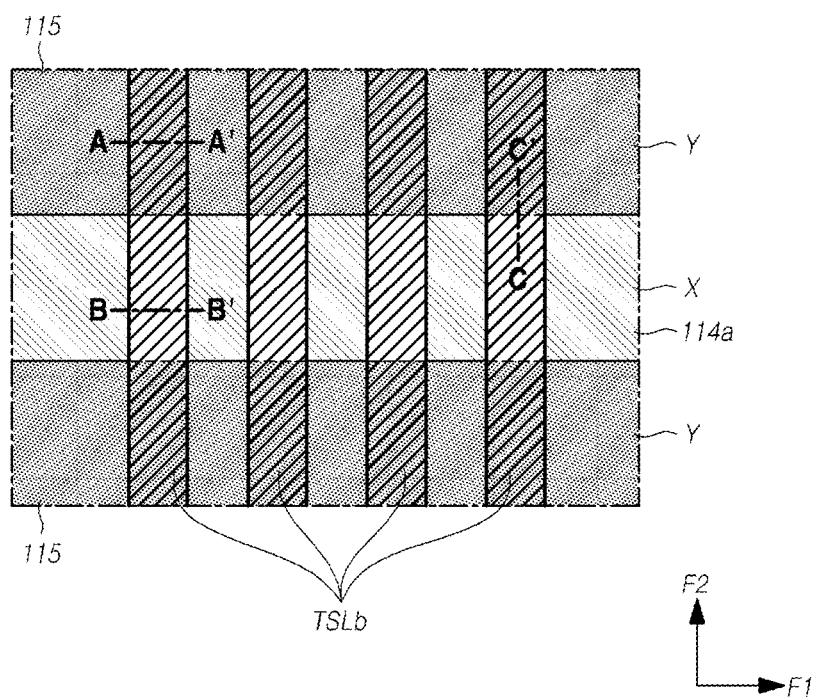
FIG. 13 is a plan view illustrating a part of a routing area in a display device according to embodiments of the present disclosure.

FIG. 13 is a plan view illustrating part of a routing area in a display device according to embodiments of the present disclosure.

Referring to FIG. 13, in the routing area of the substrate 111 may be disposed the first area X overlapping the folding region 111p and the second area Y not overlapping the folding region 111p, wherein the second area Y may be disposed to the upper side and the lower side next to the first area X, respectively. Further, the touch insulation film 115 may be disposed in the first area X and the second area Y, and as shown in FIG. 7B, the touch insulation film 115 may include a plurality of holes 115h in the first area X.

In addition, a plurality of second touch signal lines TSLb extending in the second direction F2 may be disposed in the first area X and the second area Y.

In the first area X, the touch insulation film 115 may be disposed on the touch buffer layer 114a, and the second touch signal line TSLb may be disposed on the touch insulation film 115. When each second touch signal line TSLb is disposed to overlap the hole 115h, the second touch signal line TSLb may be inserted into the hole 115h, so that the touch insulation film 115 may not be disposed at a position overlapping the second touch signal line TSLb in the upper part and the lower part of the second touch signal line TSLb. Then, in the second area Y, a plurality of second touch signal lines TSLb may be disposed on the touch insulation film 115.

Further, each second touch signal line TSLb may be disposed at a position overlapping the region between the plurality of holes 115h in the first area X. When the second touch signal line TSLb is disposed at the position overlapping the region between the plurality of holes 115h, the touch insulation film 115 may be disposed on the second touch signal line TSLb.

Figure 14:
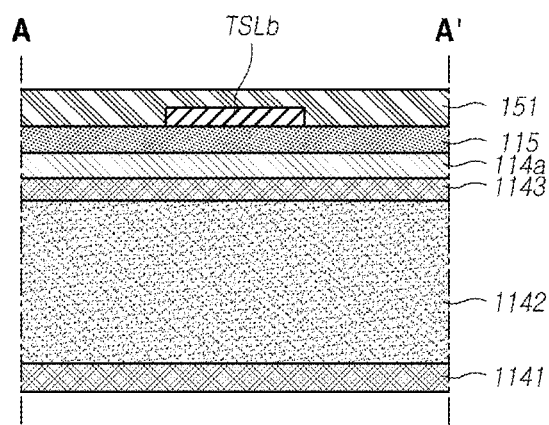
FIG. 14 is a cross-sectional view showing a cross section along a line A-A' in FIG. 13.
Figure 15:
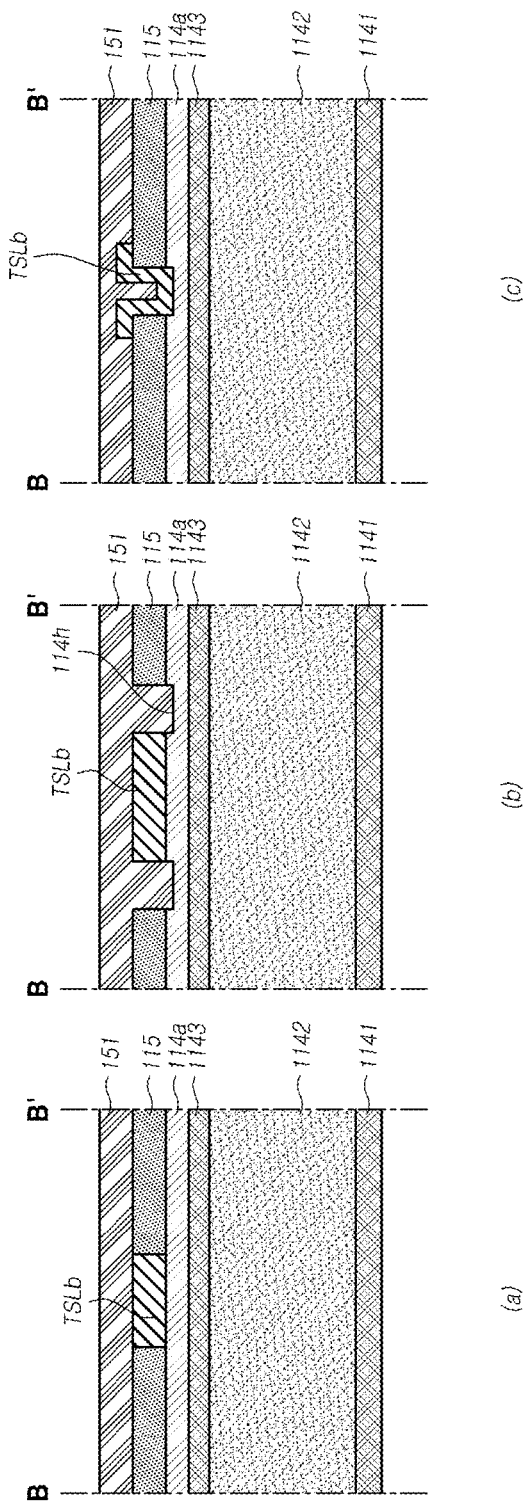
FIG. 15 is a cross-sectional view showing a cross-section along a line B-B' in FIG. 14.
Figure 16:
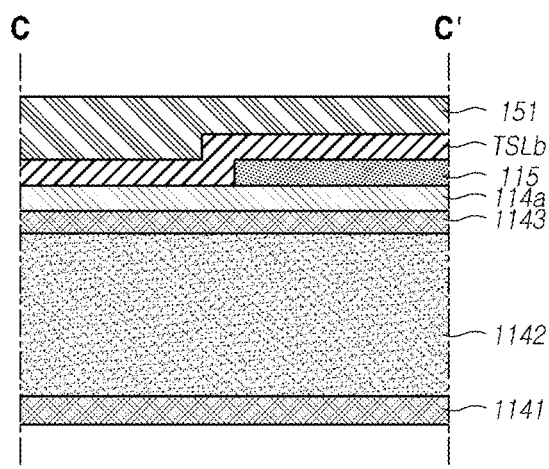
FIG. 16 is a cross-sectional view showing a cross section along a line C-C' in FIG. 13.

FIG. 14 is a cross-sectional view showing a cross section along a line A-A' in FIG. 13, FIG. 15 is a cross-sectional view showing a cross section along a line B-B' in FIG. 14, and FIG. 16 is a cross-sectional view showing a cross-section along a line C-C' in FIG. 13. Here, the second touch signal line TSLb represents the arrangement in which it is disposed to overlap each of the plurality of holes 115h.

Referring then to FIGS. 14, 15, 16, 17 and 18, a touch buffer layer 114a may be disposed on encapsulation layers 1141, 1142, and 1143 including a first inorganic film 1141, an organic film 1142, and a second inorganic film 1143. Further, the touch insulation film 115 may be disposed on the touch buffer layer 114a, and the second touch signal line TSLb may be disposed on the touch insulation film 115. Then, a touch cover 151 may be disposed on the touch insulation film 115 on which the second touch signal line TSLb is disposed. The touch insulation film 115 and the touch cover 151 may be of either an inorganic film or an organic film.

In the second area Y, the touch insulation film 115 may be disposed to cover the top surface of the touch buffer layer 114a, and the second touch signal line TSLb may be disposed over the top surface of the touch buffer layer 114a. On the other hand, in the first area X, a plurality of holes 115h may be formed in the touch insulation film 115, and the second touch signal line TSLb may be disposed at a position overlapping each of the plurality of holes 115h, so that the second touch signal line TSLb may be inserted into the hole 115h. As such, the touch insulation film 115 in the first area X may be disposed not to overlap the uppermost and lowermost surfaces of the second touch signal line TSLb.

The touch cover 151 may be disposed on the touch insulation film 115 in the first area X and the second area Y, wherein part of the touch cover 151 may be disposed in the plurality of holes 115h in the first area X. Here, the touch cover 151 may be of either an inorganic film or an organic film. The touch cover 151 may be disposed above the hole 115h in which the second touch signal line TSLb is disposed, as shown in FIG. 15(a). Further, as shown in FIG. 15(b), part of the touch cover 151 may be inserted into the hole 115h so that it may come into contact with the touch buffer layer 114a through the leftmost and rightmost sides of the second touch signal line TSLb. When the part of the touch cover 151 comes into contact with the touch buffer layer 114a, a groove 114h may be formed in the touch buffer layer 114a. Further, as shown in FIG. 15(c), a groove may be formed in the touch buffer layer 114a and the touch signal line TSLb may be inserted into the groove in the touch buffer layer 114a, so that the touch signal line TSLb can be disposed to partially overlap at its ends the touch insulation film 115.

Further, as illustrated in FIG. 16, the touch insulation film 115 may be disposed in the first area X and the second area Y, and the plurality of grooves 115h may extend within the first area X, up to a border between the first area X and the second area Y, so that the touch insulation film 115 can be disposed only in the second area Y and it may not disposed in the first area (X) corresponding to the hole 115h. Further, since the second touch signal line TSLb disposed in the first area X may be inserted into the hole 115h, it may be disposed at a position lower than the second touch signal line TSLb disposed in the second area Y.

Figure 17:
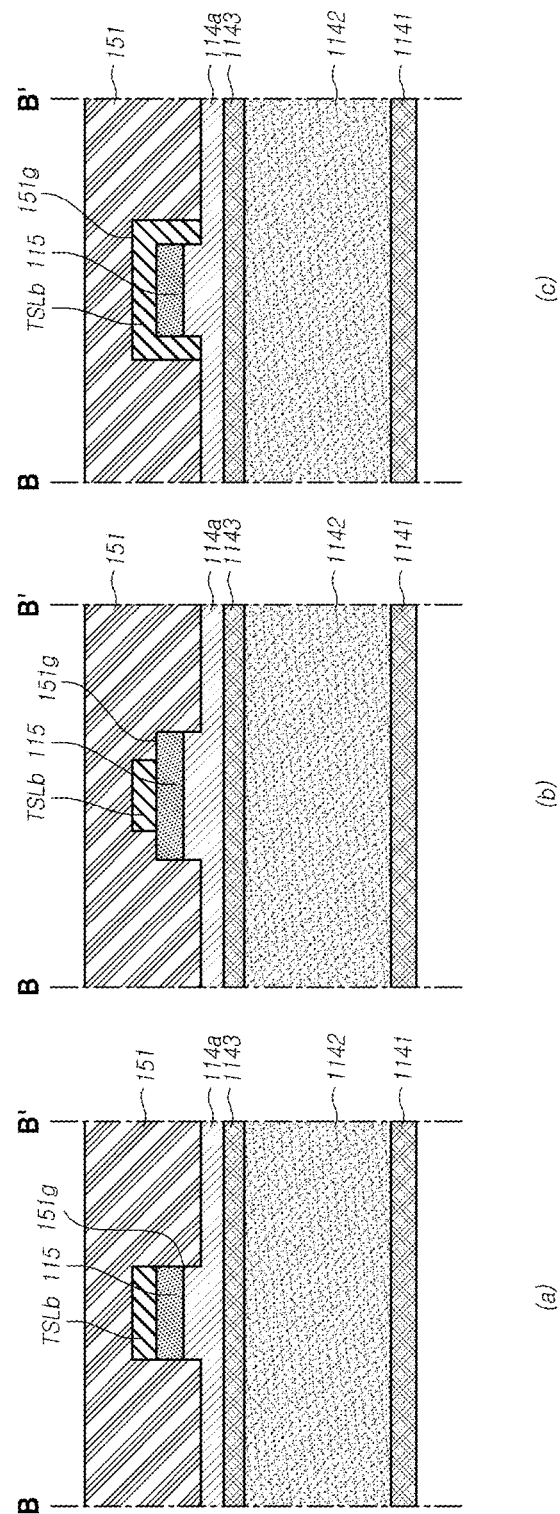
FIG. 17 is a cross-sectional view showing a cross section along a line B-B' in FIG. 13.
Figure 18:
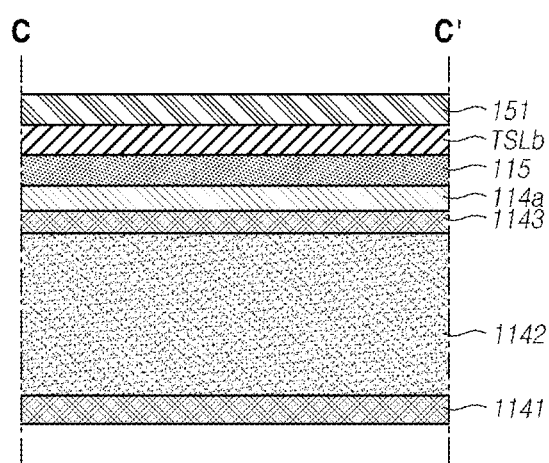
FIG. 18 is a cross-sectional view showing a cross-section along a line C-C' in FIG. 13.

FIG. 17 is a cross-sectional view showing a cross section along a line B-B' in FIG. 13, and FIG. 18 is a cross-sectional view showing a cross section along a line C-C' in FIG. 13. Here, the second touch signal line TSLb represents the arrangement in which it is disposed in between the plurality of grooves, respectively.

FIGS. 17 and 18, the touch buffer layer 114a may be disposed on the encapsulation layer 1141, 1142 and 1143 including a first inorganic film 1141, an organic film 1142 and a second inorganic film 1143. Further, the touch insulation film 115 may be disposed on the touch buffer layer 114a, and the second touch signal line TSLb may be disposed on the touch insulation film 115, wherein the touch insulation film 115 may be of an inorganic film or an organic film.

In the second area Y, the touch insulation film 115 may be disposed to cover the first touch signal line TSLa and the touch buffer layer 114a, and the second touch signal line TSLb may be disposed at a position overlapping the first touch signal line TSLa on the touch insulation film 115. The touch cover 151 may be disposed on the second touch signal line TSLb, and the touch cover 151 may be of an inorganic film or an organic film.

In the second area Y, the touch insulation film 115 and the touch buffer layer 114a may be disposed underneath the second touch signal line TSLb. In the first area X, the plurality of holes 115h may be formed in the touch insulation film 115, and each second touch signal line TSLb may be disposed between the plurality of holes 115h, respectively. Thus, the touch insulation film 115 may be disposed underneath the second touch signal line TSLb.

In addition, the touch cover 151 may be disposed on the touch insulation film 115 in the first area X and the second area Y, and the touch cover 151 may be arranged in such a manner that a groove 115g is formed at a position corresponding to the region between the holes 115h of the touch insulation film 115, and the second touch signal line TSLb and the touch insulation film 115 overlap in the groove 151g. On this occasion, part of the touch buffer layer 114a may be inserted into the groove 151g formed in the touch cover 151.

The touch insulation film 115 and the second touch signal line TSLb, both having the same width may be inserted into the groove 151g formed in the touch cover 151, as shown in FIG. 17(a). Further, the second touch signal line TSLb, and the touch insulation film 115 having a width wider than the width of the second touch signal line TSLb, as shown in FIG. 17(b), may be inserted into the groove 151g formed in the touch cover 151. Furthermore, the second touch signal line TSLb, and the touch insulation film 115 having a width narrower than the width of the second touch signal line TSLb, as shown in FIG. 17(c), may be inserted into the groove 151g formed in the touch cover 151. The second touch signal line TSLb may be disposed to cover the top surface and the side surfaces of the touch insulation film 115. At this juncture, part of the second touch signal line TSLb may be inserted into the hole 115h formed in the touch insulation film 115.

In addition, part of the touch buffer layer 114a disposed underneath the touch cover 151 may be inserted into the groove 151g formed in the touch cover 151.

Figure 19:
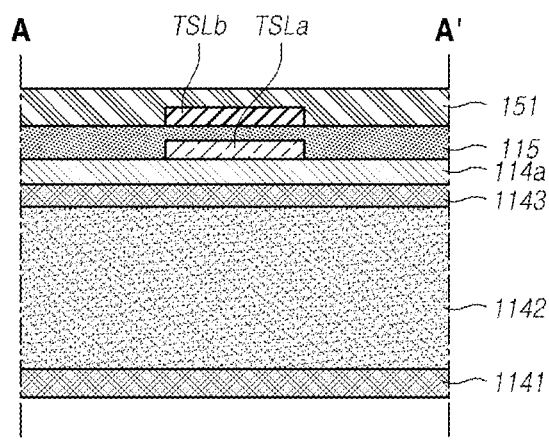
FIG. 19 is a cross-sectional view showing a cross section along a line A-A' in FIG. 7A.
Figure 20:
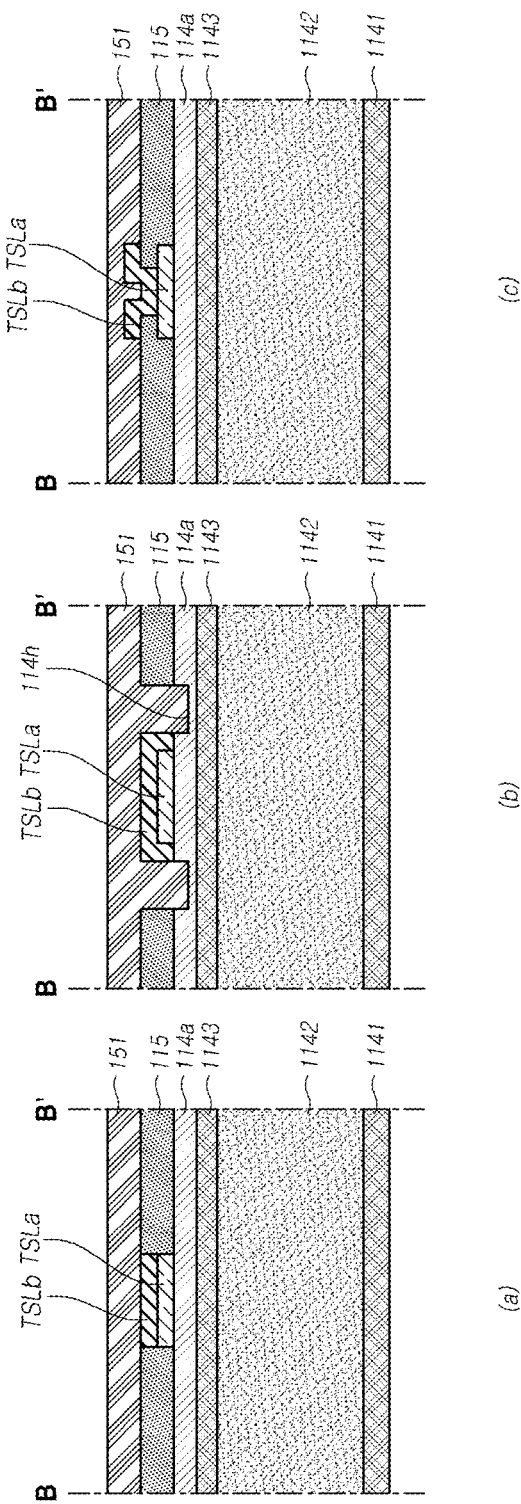
FIG. 20 is a cross-sectional view showing a cross section along a line B-B' in FIG. 7A.
Figure 21:
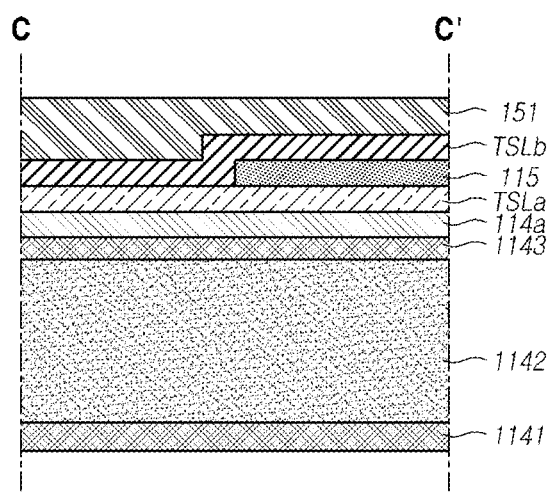
FIG. 21 is a cross-sectional view showing a cross section along a line C-C' in FIG. 7A.

FIG. 19 is a cross-sectional view showing a cross section along a line A-A' in FIG. 7A, FIG. 20 is a cross-sectional view showing a cross section along a line B-B' in FIG. 7A, and FIG. 21 is a cross-sectional view showing a cross section along a line C-C' in FIG. 7A. Although the second touch signal line TSLb is not illustrated in FIG. 7A, it is disposed to overlap the first touch signal line TSLa, so that the first touch signal line TSLa and the second touch signal line TSLb show the arrangement that they are disposed to overlap each other in each of the plurality of holes 115h included in the touch insulation film 115.

Referring then to FIGS. 19, 20 and 21, the touch buffer layer 114a may be disposed on the encapsulation layer 1141, 1142 and 1143 including the first inorganic film 1141, the organic film 1142 and the second inorganic film 1143. Further, the first touch signal line TSLa may be disposed on the touch buffer layer 114a, and the touch insulation film 115 may be disposed on the touch buffer layer 114a on which the first touch signal line TSLa is disposed. The touch insulation film 115 may be of an inorganic film or an organic film. The second touch signal line TSLb may be disposed on the touch insulation film 115 at a position overlapping the first touch signal line TSLa. Then, the touch cover 151 may be disposed on the touch insulation film 115 on which the second touch signal line TSLb is disposed, wherein the touch cover 151 may be of either an inorganic film or an organic film.

In the second area Y, the touch insulation film 115 may cover the uppermost surface of the first touch signal line TSLa and the uppermost surface of the touch buffer layer 114a. On the other hand, in the first area X, a plurality of holes 115h are formed in the touch insulation film 115, and the first touch signal line TSLa may be disposed overlapping in the plurality of holes 115h, respectively, so that the first touch signal line TSLa can be disposed in the hole 115h of the touch insulation film 115. In addition, the second touch signal line TSLb may be disposed to overlap the first touch signal line TSLa, so that the second touch signal line TSLb can be disposed at a position overlapping the hole 115h of the touch insulation film 115. Thus, the first touch signal line TSLa and the second touch signal line TSLb in the first area X may contact each other. Further, the touch insulation film 115 may not be disposed on the second touch signal line TSLb in the first area X. Furthermore, the touch cover 151 may be disposed on the touch insulation film 115 in the first area X and the second area Y, wherein part of the touch cover 151 may be disposed in the plurality of holes 115h in the first area X. The touch cover 151 may be of an inorganic film or an organic film.

The touch cover 151 may be disposed over the hole 115h in which the first touch signal line TSLa and the second touch signal line TSLb are disposed in an overlapping manner, as shown in FIG. 20(a). Further, part of the touch cover 151 may be disposed to come into contact with the touch buffer layer 114a through the leftmost side and the rightmost side of the first touch signal line TSLa and the second touch signal line TSLb inserted into the hole 115h in an overlapping manner, as shown in FIG. 20(b). When part of the touch cover 151 comes into contact with the touch buffer layer 114a, a groove 114h may be formed in the touch buffer layer 114a. Further, the width of the second touch signal line TSLb may be wider than that of the first touch signal line TSLa. Furthermore, as illustrated in FIG. 20(c), the touch insulation film 115 may be arranged to partially overlap an edge section of the first touch signal line TSLa, and the second touch signal line TSLb may come into contact with the first touch signal line TSLa, overlapping part of the touch insulation film 115.

Further, as shown in FIG. 21, the touch insulation film 115 may be disposed in the first area X and the second area Y, while it may be not disposed in an area where the first touch signal line TSLa and the second touch signal line TSLb are disposed to overlap.

Figure 22:
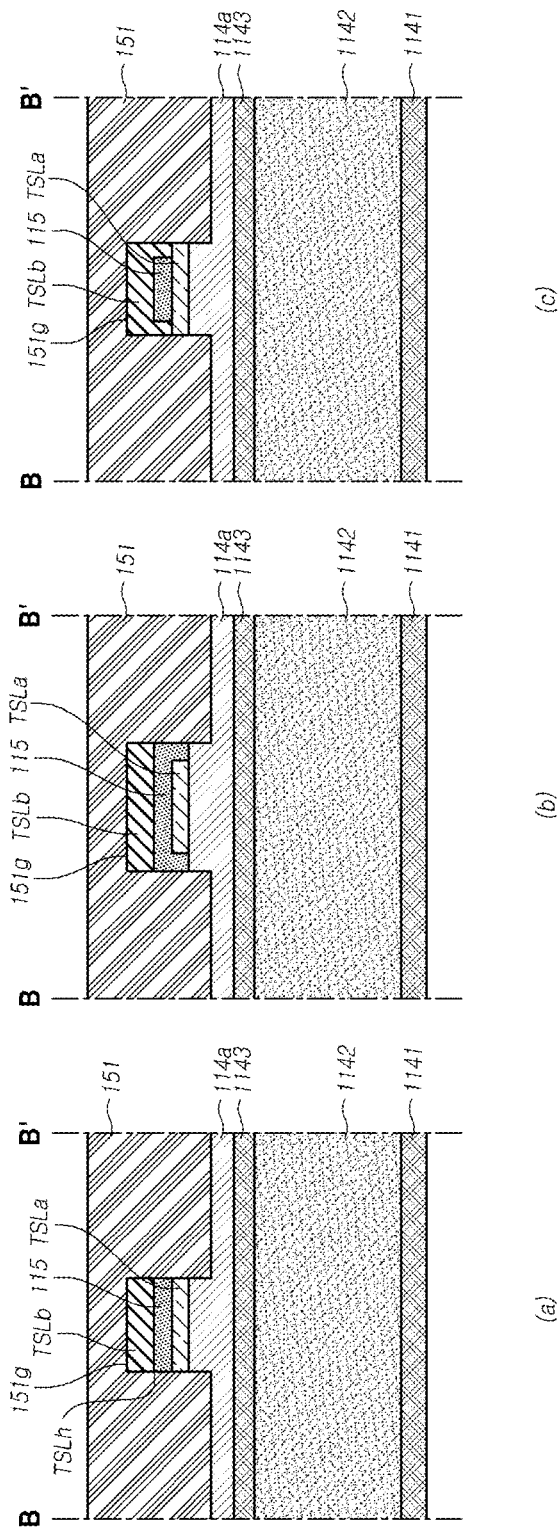
FIG. 22 is a cross-sectional view showing a cross section along a line B-B' in FIG. 7A.
Figure 23:
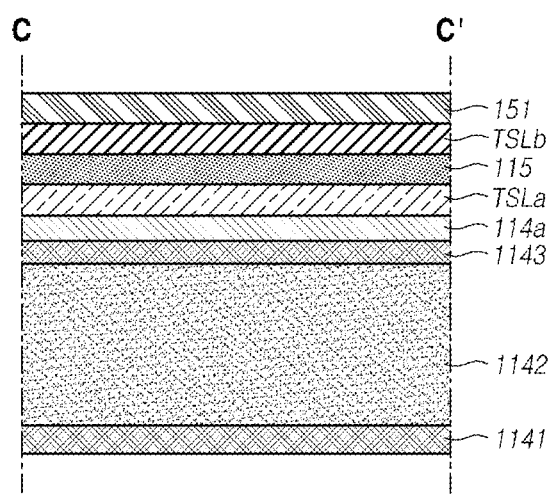
FIG. 23 is a cross-sectional view showing a cross section along a line C-C' in FIG. 7A.

FIG. 22 is a cross-sectional view showing a cross section along a line B-B' in FIG. 7A, and FIG. 23 is a cross-sectional view showing a cross section along a line C-C' in FIG. 7A. Although the second touch signal line TSLb is not illustrated in FIG. 7A, it is disposed to overlap the first touch signal line TSLa, so that the second touch signal line TSLb and the first touch signal line TSLa show the arrangement that they are disposed to overlap the region between the plurality of holes 115h included in the touch insulation film 115, respectively.

Referring then to FIGS. 22 and 23, the touch buffer layer 114a may be disposed on the encapsulation layers 1141, 1142, and 1143 including the first inorganic film 1141, the organic film 1142, and the second inorganic film 1143. Further, the first touch signal line TSLa may be disposed on the touch buffer layer 114a, and the touch insulation film 115 may be disposed on the first touch signal line TSLa. The touch insulation film 115 may be of an inorganic film or an organic film. Further, the second touch signal line TSLb may be disposed on the touch insulation film 115.

In the second area Y, the touch insulation film 115 may be disposed to cover the uppermost section of the first touch signal line TSLa and the uppermost section of the touch buffer layer 114a, and the second touch signal line TSLb may be disposed at a position overlapping the first touch signal line TSLa on the touch insulation film 115. On the other hand, a plurality of holes 115h may be formed in the touch insulation film 115 in the first area X, and the first touch signal line TSLa and the second touch signal line TSLb may be respectively disposed in the region between the plurality of holes 115h, so that the touch insulation film 115 can be disposed between the first touch signal line TSLa and the second touch signal line TSLb. In addition, the touch cover 151 may be disposed on the touch insulation film 115 in the first area X and the second area Y.

In the touch cover 151, a groove 151g may be formed at a position corresponding to an area between the holes 115h of the touch insulation film 115, and the first touch signal line TSLa and the second touch signal line TSLb may be disposed to overlap in the groove 151g. At this juncture, part of the touch buffer layer 114a may be inserted into the groove 151g formed in the touch cover 151.

The first touch signal line (TSLa), the touch insulation film 115, and the second touch signal line TSLb, all having the same width, as shown in FIG. 22(a), may be inserted into the groove 151g formed in the touch cover 151. Further, the first touch signal line TSLa, the touch insulation film 115 and the second touch signal line TSLb, two of the latter having a width wider than that of the first touch signal line TSLa may be inserted into the groove 151g, as shown in FIG. 22(b). The touch insulation film 115 may be disposed to cover the top and side surfaces of the first touch signal line TSLa. Furthermore, the first touch signal line TSLa, the touch insulation film 115 having a width narrower than that of the first touch signal line TSLa, and the second touch signal line TSLb, may be inserted into the groove 151g formed in the touch cover 151, as shown in FIG. 22(c). The second touch signal line TSLb may be disposed to cover the upper and side surfaces of the touch insulation film 115.

In addition, as illustrated in FIG. 23, the touch insulation film 115 may be disposed in the first area X and the second area Y.

Figure 24:
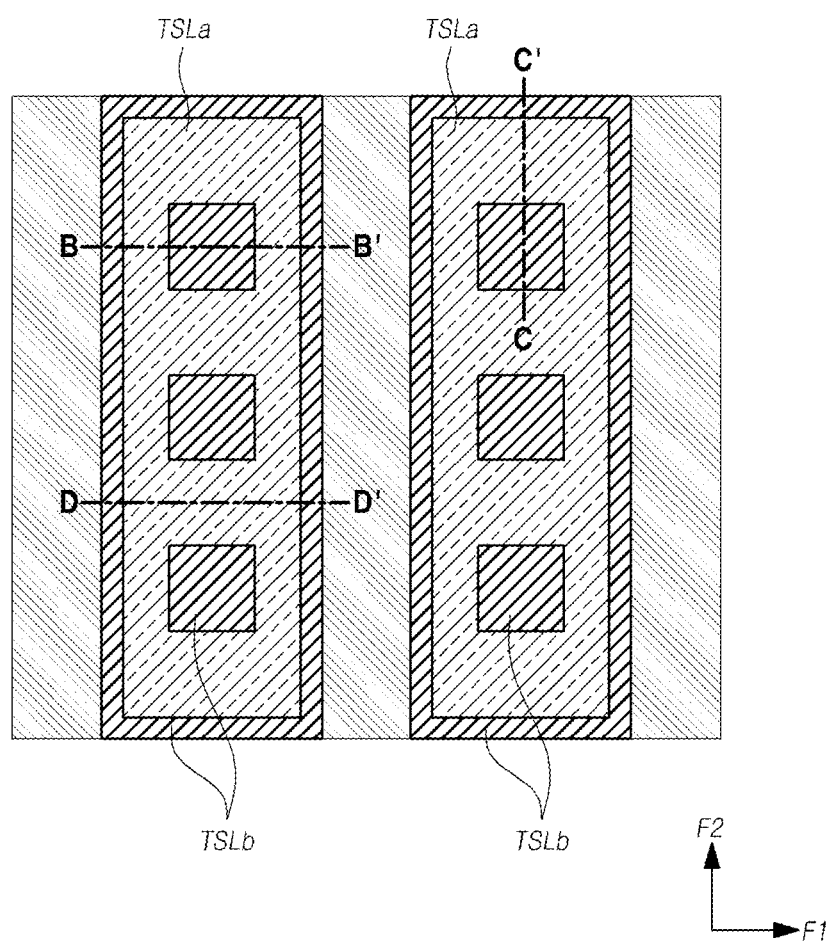
FIG. 24 is a plan view illustrating a first area of the display device illustrated in FIG. 3.
Figure 25:
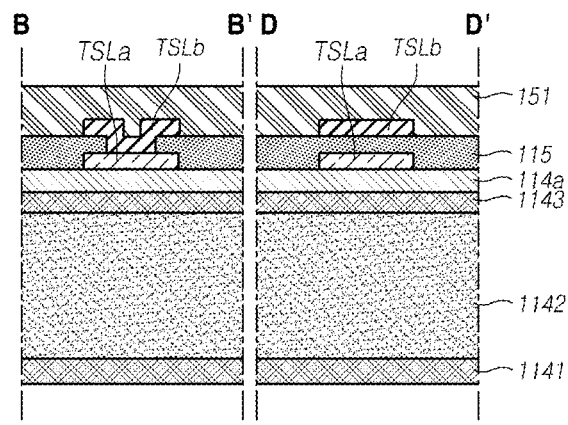
FIGS. 25 and 26 each are cross-sectional views illustrating a first area of the display device illustrated in FIG. 3.
Figure 26:
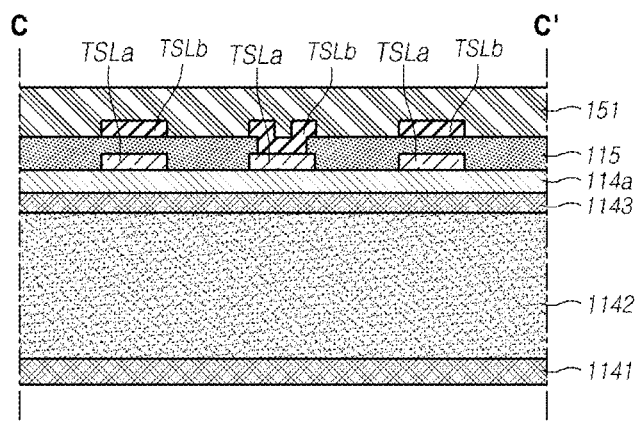

FIG. 24 is a plan view illustrating a first area of the display device illustrated in FIG. 3, and FIGS. 25 and 26 are cross-sectional views illustrating a first area of the display device illustrated in FIG. 3.

Referring then to FIGS. 24, 25 and 26, touch signal lines TSLa and TSLb extending in the second direction F2 may be arranged in the first area X. The touch signal lines TSLa and TSLb may include a first touch signal line TSLa and a second touch signal line TSLb, and the first touch signal line TSLa may be disposed below the second touch signal line TSLb, so that the second touch signal line TSLb and the first touch signal line TSLa can overlap.

Further, the touch insulation film 115 may be disposed between the first touch signal line TsLa and the second touch signal line TSLb. A plurality of grooves may be arranged, in the second direction F2, at positions that the first touch signal line TSLa and the second touch signal line TSLb overlap in the touch insulation film 115, and the second touch signal line TSLb may contact the first touch signal line TSLa through the plurality of grooves. Therefore, as shown in FIG. 25, when viewing the cross section of the line B-B', the second touch signal line TSLb comes into contact with the first touch signal line TSLa, while when viewing the cross section of the line D-D', the second touch signal line TSLb does not come into contact with the first touch signal line TSLa. Furthermore, as shown in FIG. 26, when viewing the cross section of the line C-C', it is shown that the second touch signal line TSLb is partially in contact with the first touch signal line TSLa.

Then, the touch cover 151 may be disposed on the second touch signal line TLSb.

Figure 27:
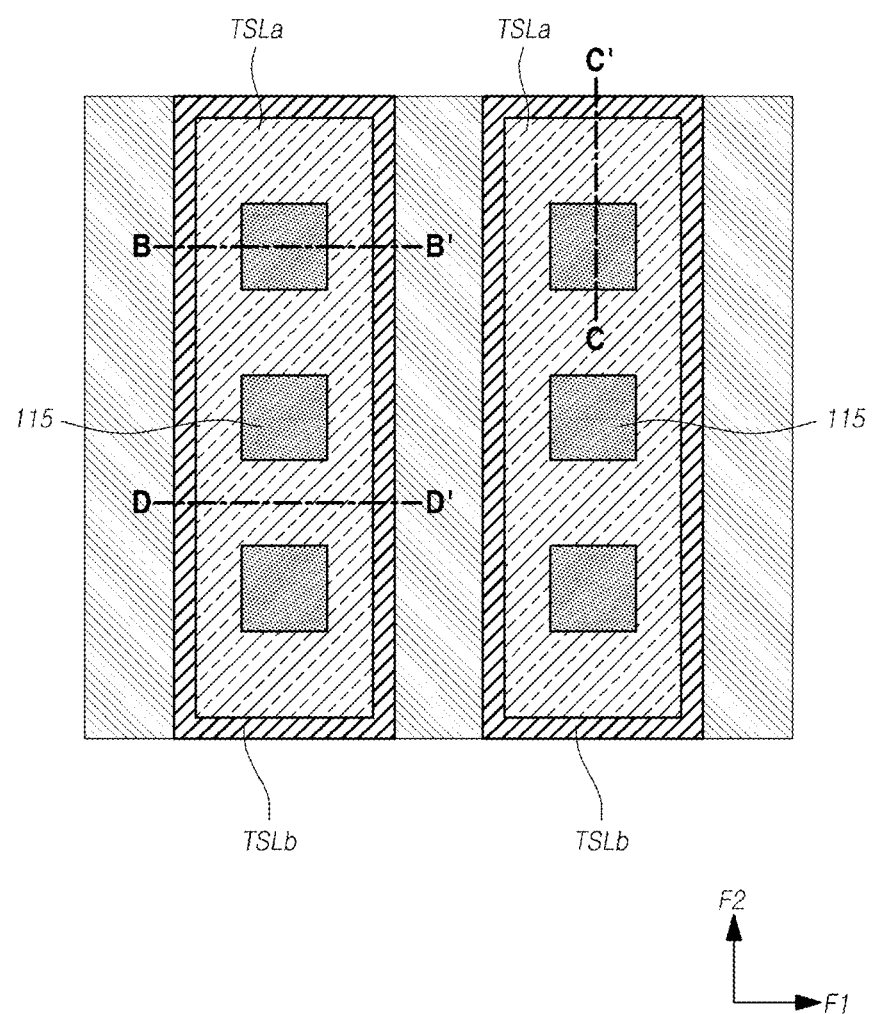
FIG. 27 is a plan view illustrating the first area of the display device illustrated in FIG. 3.
Figure 28:
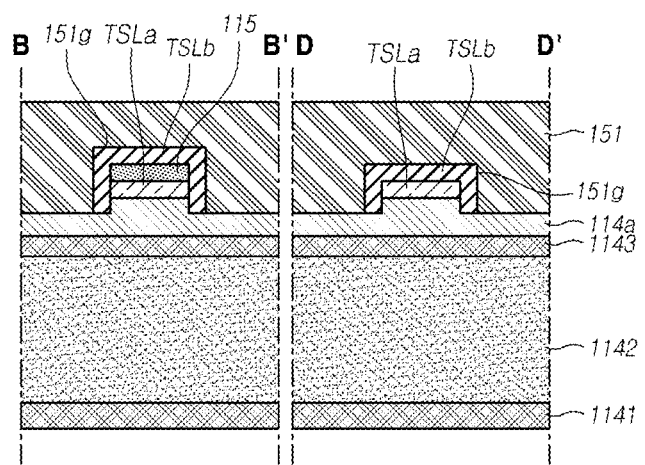
FIG. 28 is a cross-sectional view illustrating the first area of the display device illustrated in FIG. 3.

FIG. 27 is a plan view showing a first area of the display device shown in FIG. 3, and FIG. 28 is a cross-sectional view showing a first area of the display device shown in FIG. 3.

Referring now to FIGS. 27 and 28, touch signal lines TSLa and TSLb extending in the second direction F2 may be disposed in the first area X. The touch signal lines TSLa and TSLb may include a first touch signal line TSLa and a second touch signal line TSLb, and the first touch signal line TSLa may be disposed underneath the second touch signal line TSLb, so that the second touch signal line TSLb and the first touch signal line TSLa can overlap each other.

Further, the touch insulation film 115 may be disposed between the first touch signal line TSLa and the second touch signal line TSLb, and the touch insulation film 115 may be disposed, in the second direction F2, at a position where the first touch signal line TSLa and the second touch signal line TSLb overlap each other. The first touch signal line TSLa and the second touch signal line TSLb may come into contact with each other at a portion where the touch insulation film 115 is not disposed.

Therefore, as shown in FIG. 28, when viewing the cross-section of the line B-B', the touch insulation film 115 is disposed between the second touch signal line TSLb and the first touch signal line TSLa, so that the second touch signal line TSLb and the first touch signal line TSLa are not in contact. However, the cross-section of the line D-D' shows that the second touch signal line TSLb and the first touch signal line TSLa are disposed to contact each other, since the touch insulation film 115 is not disposed between the second touch signal line TSLb and the first touch signal line TSLa.

Further, the touch cover 151 may be disposed on the second touch signal line TLSb. A groove 151g may be formed in the touch cover 155, and as shown in FIG. 28, the cross-section taken along the line B-B' shows that the first touch signal line TSLa, the touch insulation film 115 and the second touch signal line TLSb are stacked, while the cross-section taken along the line D-D' shows that the first touch signal line TSLa and the second touch signal line TLSb are stacked. The depth of the groove 151g into which the touch insulation film 115 is inserted among those grooves 151g may be deeper than the other.

Figure 29:
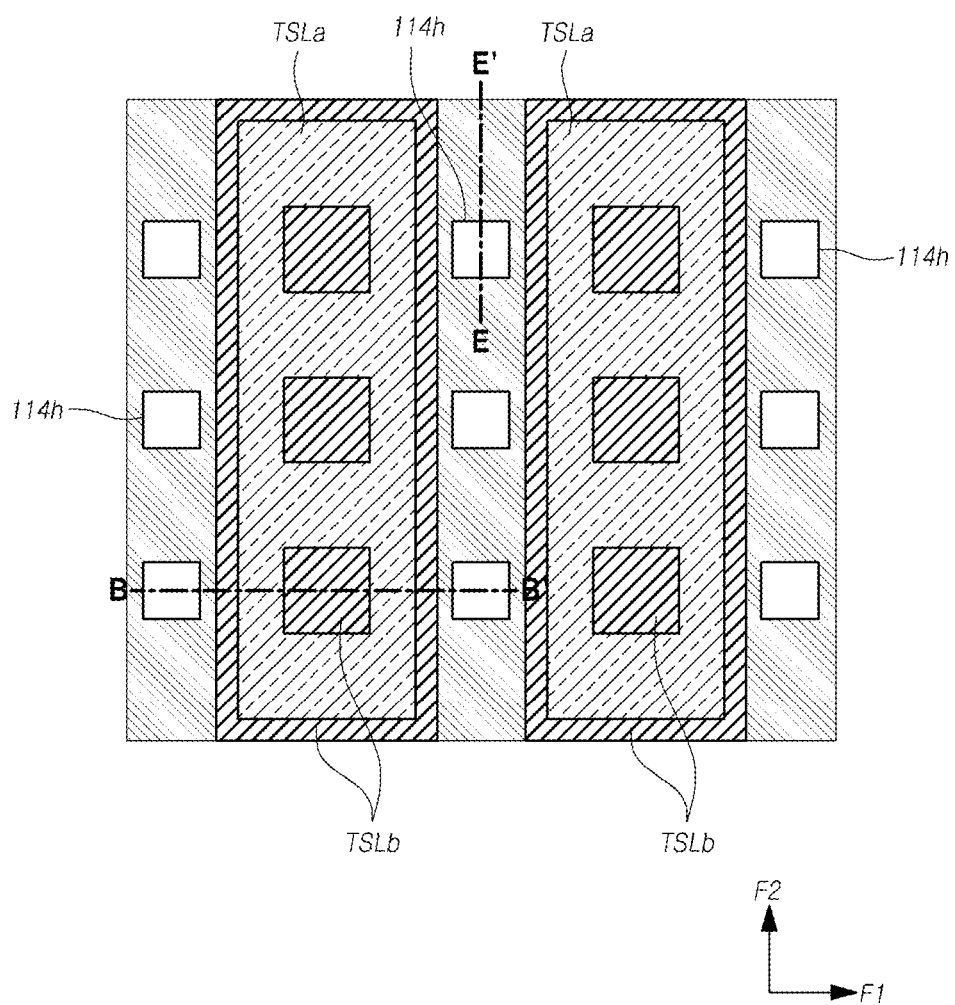
FIG. 29 is a plan view illustrating the first area of the display device illustrated in FIG. 3.
Figure 30:
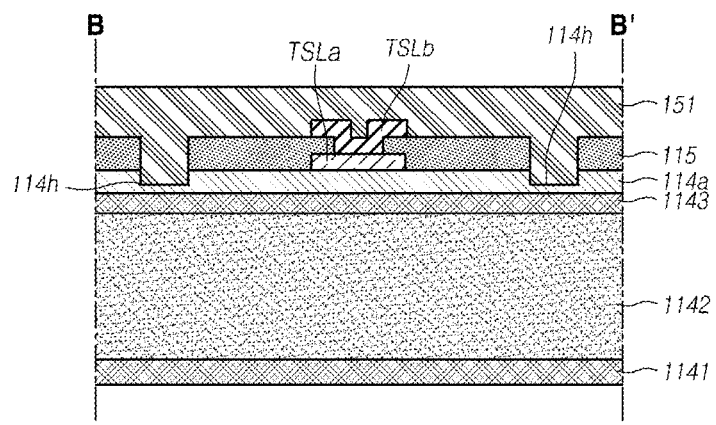
FIGS. 30 and 31 each are cross-sectional views illustrating the first area of the display device illustrated in FIG. 3.
Figure 31:
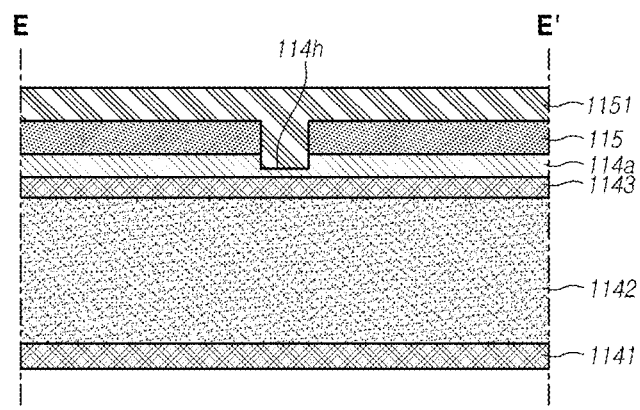

FIG. 29 is a plan view showing the first area shown in FIG. 3, and FIGS. 30 and 31 each are cross-sectional views showing the first area shown in FIG. 3.

Referring then to FIGS. 29, 30 and 31, touch signal lines TSLa and TSLb extending in the second direction F2 may be disposed in the first area X. The touch signal lines TSLa and TSLb may include a first touch signal line TSLa and a second touch signal line TSLb, and the first touch signal line TSLa may be disposed underneath the second touch signal line TSLb, so that the second touch signal line TSLb and the first touch signal line TSLa may overlap each other.

Further, the touch insulation film 115 may be disposed between the first touch signal line TSLa and the second touch signal line TSLb. A plurality of grooves are arranged in the second direction F2 on the touch insulation film 115, and the second touch signal line TSLb may come into contact with the first touch signal line TSLa through the plurality of grooves. In addition, the touch cover 151 may be disposed on the second touch signal line TLSb. Thus, as shown in FIGS. 30 and 31, it is seen that the cross section of the line B-B' and the cross section of the line E-E' each show that part of the touch cover 151 may penetrate the touch insulation film 115 to contact the touch buffer layer 114a. A groove 114h may be formed in a portion where the part of the touch cover 151 come into contact with the touch buffer layer 114a.

Figure 32:
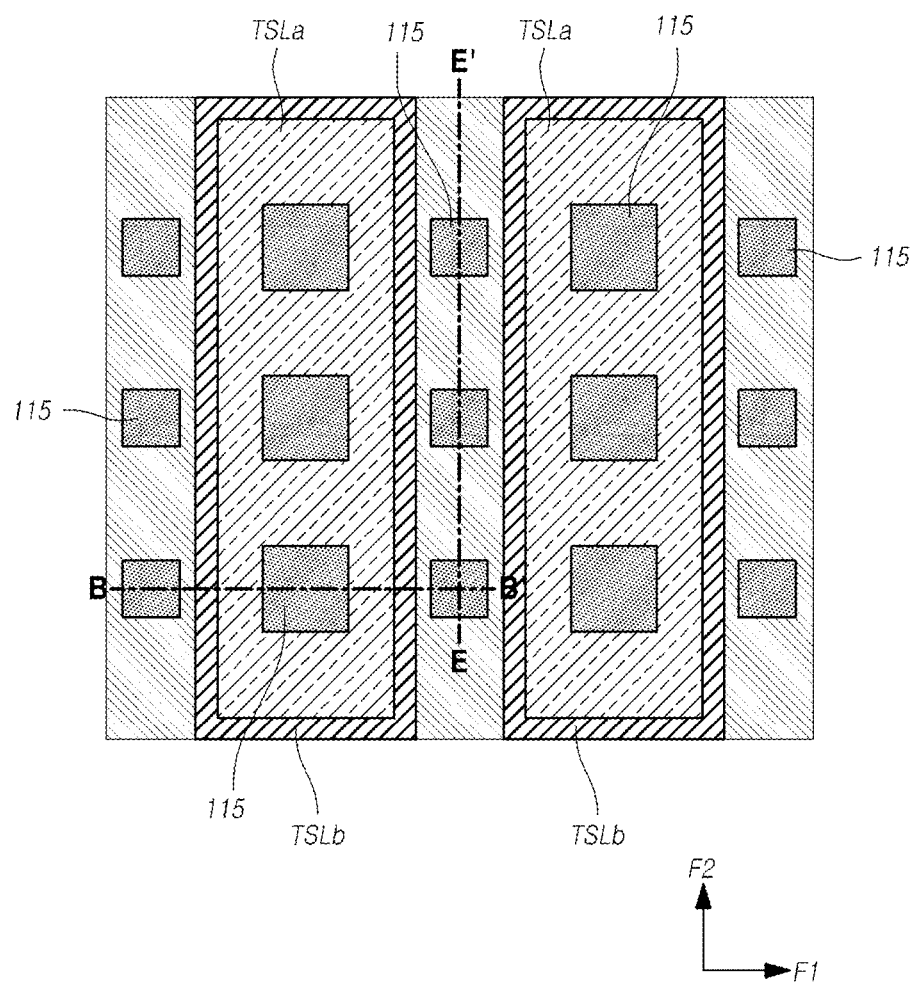
FIG. 32 is a plan view illustrating the first area of the display device illustrated in FIG. 3.
Figure 33:
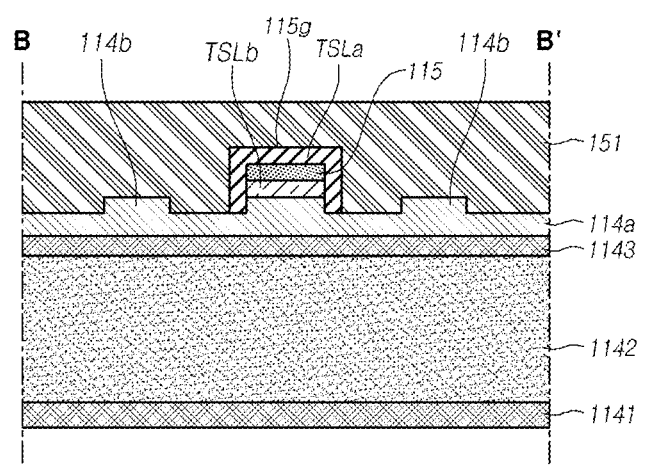
FIGS. 33 and 34 each are cross-sectional views illustrating the first area of the display device illustrated in FIG. 3.
Figure 34:
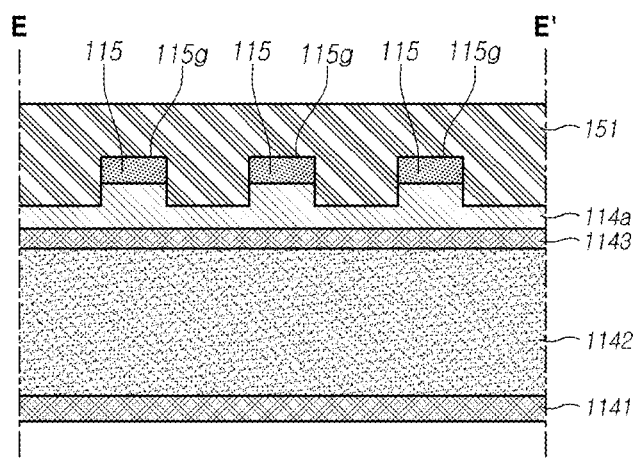

FIG. 32 is a plan view showing the first area of the display device illustrated in FIG. 3, and FIGS. 33 and 34 each are cross-sectional views showing the first area of the display device illustrated in FIG. 3.

Referring then to FIGS. 32, 33 and 34, touch signal lines TSLa and TSLb extending in the second direction F2 may be disposed in the first area X. The touch signal lines TSLa and TSLb may include a first touch signal line TSLa and a second touch signal line TSLb, and the first touch signal line TSLa may be disposed underneath the second touch signal line TSLb, so that the second touch signal line TSLb and the first touch signal line TSLa can overlap.

Further, the touch insulation film 115 may be disposed between the first touch signal line TSLa and the second touch signal line TSLb. The touch insulation film 115 may be arranged at a predetermined interval between the first touch signal line TSLa and the second touch signal line TSLb. The first touch signal line TSLa and the second touch signal line TSLb may come into contact with each other in the region where the touch insulation film 115 is not arranged, and part of the touch buffer layer 114a may be disposed to partially protrude between the touch signal lines TSLa and TSLb.

As shown in FIGS. 33 and 34, the cross-section of the line B-B' and the cross-section of the line E-E' each show that protrusions 114b from the touch buffer layer 114a are disposed to the left and right sides of a portion in which the second touch signal line TSLb and the first touch signal line TSLa are stacked overlapping each other.

Then, the touch cover 151 may be disposed, in which a groove 115g may be formed. Among those grooves 115g, a depth of the groove 115g into which the first touch signal line TSLa and the second touch signal line TSLb are inserted may be the larger, while a depth of the groove 115g into which none of the first touch signal line TSLa and the second touch signal line TSLb is inserted may be the smaller.

Figure 35:
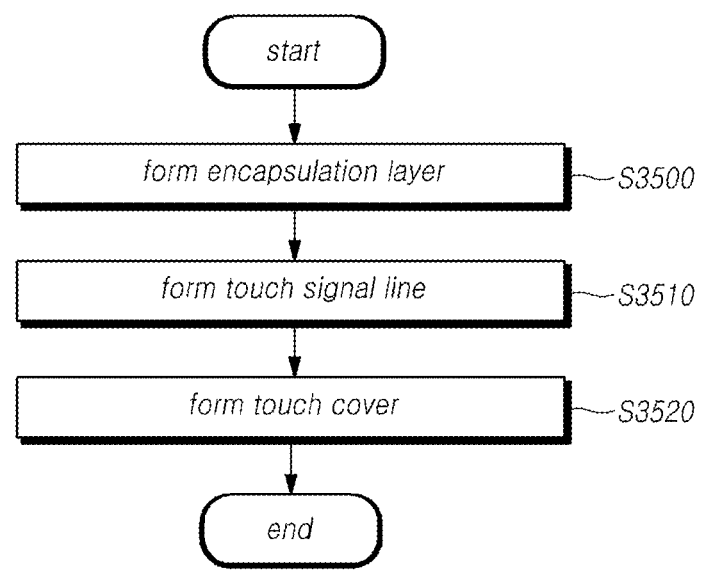
FIG. 35 is a flowchart illustrating a method of manufacturing a display device according to embodiments of the present disclosure.

FIG. 35 is a flowchart illustrating a method of manufacturing the display device according to embodiments of the present disclosure.

Referring now to FIG. 35, the method of manufacturing a display device may include forming an encapsulation layer on the display device (S3500). The encapsulation layer may include a first inorganic film, an organic film and a second inorganic film. The display device may be divided into a display area and a routing area, and a dam may be disposed in the routing area to prevent the organic film of the encapsulation layer from passing into the routing area. The display area may include a plurality of pixels, wherein each pixel may be divided into a light emitting diode and a pixel circuit supplying a driving current to the light emitting diode, and the encapsulation layer may serve to prevent any foreign matter or moisture from penetrating the light emitting diode.

A plurality of touch signal lines may be formed on the encapsulation layer (S3510). The plurality of touch signal lines may be adapted to supply a touch driving signal to a touch sensor and receive a touch sensing signal from the touch sensor. When the plurality of touch signal lines are formed, at least one touch sensor may be disposed on the encapsulation layer. The plurality of touch signal lines may be disposed at positions overlapping the routing area, respectively.

Further, a touch insulation film including a plurality of grooves may be disposed in a first area on the encapsulation layer in which the plurality of touch signal lines are arranged. The touch insulation film may include an organic film or an inorganic film. The touch insulation film may be disposed on the encapsulation layer, and a plurality of grooves may be disposed in the touch insulation film disposed in the first area on the encapsulation layer. The first area may partially overlap the folding area of a substrate.

In addition, a plurality of touch signal lines may be respectively disposed in the plurality of grooves formed in the touch insulation film. Further, the plurality of touch signal lines may be disposed between the plurality of grooves formed in the touch insulation film, respectively.

Furthermore, before disposing the touch signal line on the encapsulation layer, a touch insulation film including a plurality of grooves may be disposed in the first area of the encapsulation layer. Further, a plurality of touch signal lines may be disposed in the plurality of grooves, respectively. Further, a plurality of touch signal lines may be disposed between the plurality of grooves, respectively.

The touch signal line may include a first touch signal line and a second touch signal line stacked up and down. The first touch signal line and the second touch signal line may be disposed to contact each other in at least a portion of the first area.

Then, in order to prevent the encapsulation layer from being damaged by the touch signal line and the touch sensor, the touch signal line and the touch sensor may be formed after forming the touch buffer layer on the encapsulation layer.

Furthermore, a touch cover may be formed on the encapsulation layer on which the touch signal line is formed (S3520). The touch cover may serve to protect the touch signal line and the touch sensor, and the touch cover may further include an organic film or an inorganic film.

It will be apparent to those skilled in the art that various modifications and variations can be made in the touch display device and the method for manufacturing the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a substrate including a display area, a routing area between an edge of the substrate and display area, and a folding area overlapping a part of the display area and the routing area;
   an encapsulation layer disposed on the display area and the routing area;
   a plurality of touch electrode on the encapsulation layer in the display area;
   a first touch signal line on the encapsulation layer in the routing area; and
   a touch insulation film disposed on the encapsulation layer and having a patterned shape on the first touch signal line in the folding area.

2. The display device according to claim 1, wherein the patterned shape is a shape of a hole through which the touch insulating film is penetrated.

3. The display device according to claim 2, wherein the first touch signal line is located in the hole.

4. The display device according to claim 1, wherein the patterned shape is a shape of a groove formed on the rear surface of the touch insulating film.

5. The display device according to claim 4, wherein the first touch signal line is located in the groove.

6. The display device according to claim 1, wherein the substrate further comprises a circuit area to which the driver IC is electrically connected and does not overlap the display area, and a portion of the display area is positioned between the circuit area and the folding area.

7. The display device according to claim 1, further comprising a second touch signal line on the first touch signal line and the touch insulation film in the routing area.

8. The display device according to claim 7, wherein in the routing area, the touch insulating film is disposed between the first second touch signal line and the first touch signal line, and all or part of the second touch signal line overlaps the first touch signal line.

9. The display device of claim 1, wherein the touch insulation film comprises an organic material.

10. The display device of claim 1, further comprising a dam in the routing area, and wherein the first touch signal line is disposed between the display area and the dam.

* * * * *